United States Patent
Kaddoura

(10) Patent No.: US 11,930,583 B1
(45) Date of Patent: Mar. 12, 2024

(54) HEAT CONDITIONING THROUGH DEFLECTION/REFLECTION/ABSORPTION OF ELECTROMAGNETIC WAVES

(71) Applicant: Ali Kaddoura, Muharraq (BH)

(72) Inventor: Ali Kaddoura, Muharraq (BH)

( * ) Notice: Subject to any disclaimer, the term of this patent is extended or adjusted under 35 U.S.C. 154(b) by 36 days.

(21) Appl. No.: 17/972,185

(22) Filed: Oct. 24, 2022

Related U.S. Application Data

(60) Provisional application No. 63/404,647, filed on Sep. 8, 2022.

(51) Int. Cl.
| | |
|---|---|
| H05H 1/24 | (2006.01) |
| B64G 1/10 | (2006.01) |
| H05H 1/16 | (2006.01) |
| H05H 1/46 | (2006.01) |
| H05H 1/54 | (2006.01) |

(52) U.S. Cl.
CPC .............. H05H 1/24 (2013.01); B64G 1/10 (2013.01); H05H 1/16 (2013.01); H05H 1/46 (2013.01); H05H 1/54 (2013.01)

(58) Field of Classification Search
CPC .. H05H 1/24; H05H 1/20; H05H 1/16; H05H 1/46; H05H 1/54; E21B 43/24; B64G 1/10
See application file for complete search history.

(56) References Cited

U.S. PATENT DOCUMENTS

| | | | |
|---|---|---|---|
| 5,715,029 A | 2/1998 | Fergason | |
| 5,859,428 A * | 1/1999 | Fruchtman | ............... H05H 3/02 315/111.41 |
| 6,457,678 B1 | 10/2002 | Draim | |
| 6,825,779 B2 * | 11/2004 | Yasui | ...................... G08G 1/166 701/1 |
| 7,482,273 B1 * | 1/2009 | Klein | ...................... H01Q 1/366 343/908 |
| 7,566,889 B1 * | 7/2009 | Klein | ....................... H01Q 3/46 343/912 |
| 7,806,369 B2 | 10/2010 | Kawaguchi | |
| 8,205,839 B2 | 6/2012 | Anzel et al. | |

(Continued)

FOREIGN PATENT DOCUMENTS

| | | | | |
|---|---|---|---|---|
| CN | 105074866 A | * | 11/2015 | ............... B05D 1/62 |
| KR | 20130135433 A | * | 12/2013 | |
| KR | 20220132933 A | * | 10/2022 | |

OTHER PUBLICATIONS

Gruber, Jessica; Brief Reflections from a Plasma Mirror; Max Planck Institute; Dec. 5, 2018; pp. 1-1; Garching, Germany.

(Continued)

*Primary Examiner* — Vibol Tan
(74) *Attorney, Agent, or Firm* — Key IP Law Group, PLLC

(57) ABSTRACT

A system for heat conditioning an area of Earth includes an Earth-orbiting satellite. The satellite includes a power supply, a precursor gas supply, and one or more double helicon plasma beam generators coupled to the power supply and the gas supply and configured to generate a high-density plasma and further configured with a magnetic nozzle to maintain a shape of the beam; therefore, the top surface area of the beam is maximized. The generated high-density plasma provides enhanced electromagnetic waves absorption, reflection, and deflection of incoming solar light and electromagnetic radiation, thereby, reducing the heat striking the area of the Earth.

21 Claims, 24 Drawing Sheets

(56) References Cited

U.S. PATENT DOCUMENTS 9,591,741 B2 * 3/2017 Larigaldie ............... H05H 7/02
9,706,634 B2 * 7/2017 Liang .................... H01L 21/308

OTHER PUBLICATIONS

Kuo, Spencer; Linear and Nonlinear Plasma Processes in Ionospheric HF Heating; Plasma 2021; Feb. 23, 2021; pp. 1-37; MDPI, Basel, Switzerland.

Dowdye, E. H.; The Solar Plasma Limb . . . ; Astron. Nachr./AN 000; 2018; pp. 1-9; WILEY-VCH Verlag GmbH &Co.KGaA, Weinheim, Germany.

Merk, F.; The role of photon self-absorption in the H (n=2) density . . . ; Plasma Sources Sci Technol, 30; Jun. 15, 2021; pp. 1-9; IOP Publ; UK.

Borovsky, Joseph E.; The protron and electron radiation belts . . . ; Journal of Geophysical Research; Jun. 28, 2016; pp. 1-40; AGU Pub.; Online.

Allamandola, L.J.; Interstellar Polycyclic Aromatic Hydrocarbons . . . Science, V. 237, No. 4810; Jul. 3, 1987; Abstract; Online.

Ho, Mae-Wan; Earth's Magnetized Plasma Shield & Earth-Sun Connection; Science in Society 68; Sep. 12, 2015; pp. 12-15.

Dowdye, Edward H.; The Shapiro Delay: A Frequency Dependent Transient-Time Effect; Proceeding of the NPA; 2011; pp. 1-5.

Wilhelm, K.; Solar coronal-hole plasma densities and temperatures; Astronomy & Astrophysics, 455, 697-708; 2006.

El-Ashry, M. Y.; On the self-Trapping of an Electromagnetic Wave in Magnetized Plasma; IAEA; pp. 1-6; 1987, Miramare, Trieste.

Pireaux, Sophie; Light deflection experiments as a test of relativistic theories of gravitation; Dissertation; pp. 1-196; Universite Catholique De Louvain, Sep. 2002.

Cannon, Patrick David; Numerical Simulation of Wave-Plasma Interactions in the Ionosphere; Thesis; pp. 1-297; Jun. 2016; Lancaster University.

Takahashi, Kazunori; Hellicon-type radio-frequency thrusters and magnetic plasma nozzles; Modern Plasma Physics, 3:3; May 22, 2019; Online.

Mercier, C.; Electron density and temperature in the solar corona from multifrequency radio imaging; Astronomy & Astrophysics; A&A 583, A101, pp. 1-11; Paris, France, 2015.

* cited by examiner

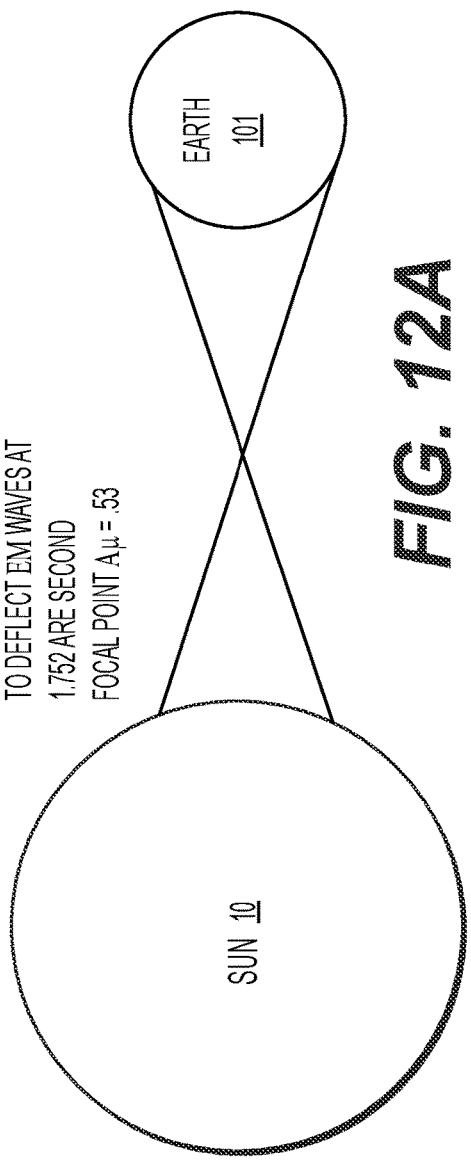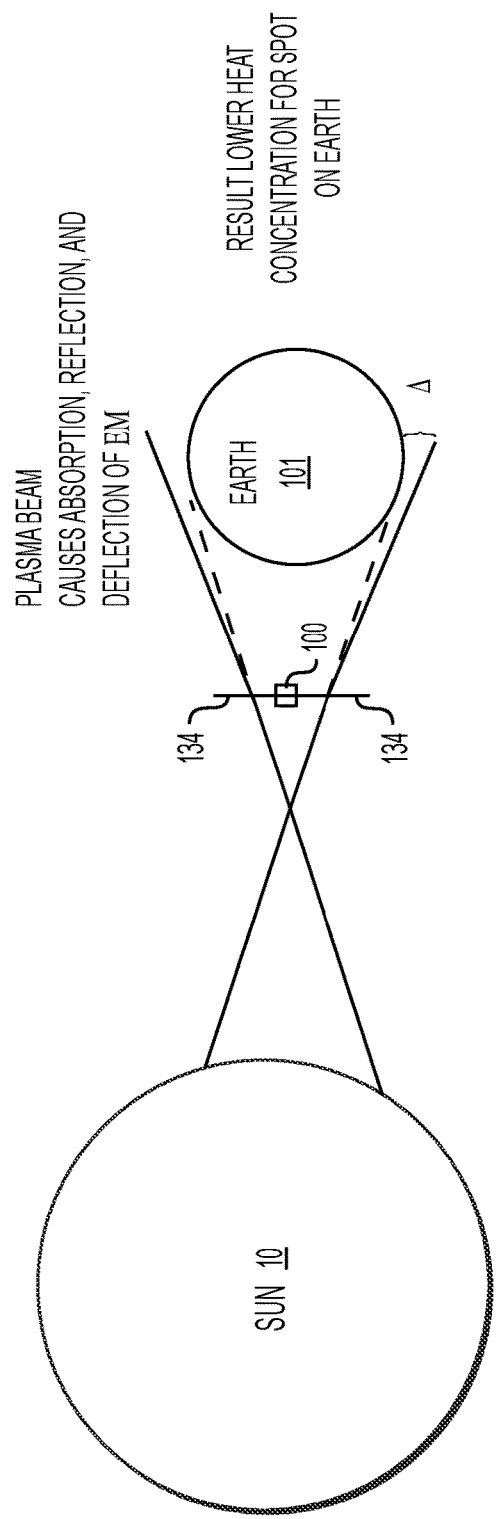

| TIME | 10 AM | 11 AM | NOON | 1 PM | 2 PM |
|---|---|---|---|---|---|
| AZIM | 120.5° | 138.5° | 155° | 182° | 200° |
| ELEV | 36.66° | 45.66° | 51.5° | 53° | 50° |

HEAT CONDITIONING THROUGH DEFLECTION/REFLECTION/ABSORPTION OF ELECTROMAGNETIC WAVES

RELATED APPLICATIONS

This application claims priority to U.S. Provisional Patent Application 63/404,647, filed Sep. 8, 2022, and entitled HEAT CONDITIONING THROUGH DEFLECTION/REFLECTION/ABSORPTION OF ELECTROMAGNETIC WAVES. The content of this Provisional Application is incorporated by reference.

BACKGROUND

Energy (heat) is transmitted to Earth from the Sun by radiation and light, which are electromagnetic waves. Maxwell's equations provide the relation between the electrical and magnetic components of electromagnetic waves. Waves move at the speed of light in a vacuum. The energy of the electromagnetic waves is proportional to their frequency. We know from Einstein's General Theory that electromagnetic waves move in a straight line in vacuums and bend at an astronomic distance with the planets' gravity and the Sun's gravity.

The distance between the Sun and Earth is measured by the astronomical unit (AU)=1; but this distance varies since the Earth travels around the Sun in an oval orbit.

FIG. 1 illustrates the natural phenomena of solar limbs. In FIG. 1, solar limbs, namely, the solar plasma atmosphere through which the light rays are directed along a minimum energy or least time path towards Earth. The thickness of the plasma atmosphere of the Sun, frequently referred to as the solar rim or the solar limb, is very negligible in comparison to the solar radius R. Centuries of observations confirm the existence of gravitational light bending as a function of the distance above the solar plasma limb. (Many of the observed solar light bending events were recorded during solar eclipses during which the Moon provided near-perfect masking of the solar disk, allowing only the thin plasma limb of the sun to be exposed for astrophysical observations.)

FIG. 2 is a representation of Earth-Sun magnetic flux connection.

SUMMARY

A system for heat conditioning an area of Earth includes a geosynchronous satellite comprising one or more double helicon plasma beam generators configured to generate a high-density plasma and further configured to shape the high-density plasma using an oval shape nozzle to maintain beam thickness to a minimum and maximize the beam top surface area. Only electromagnetic waves with a frequency higher than the plasma frequency will propagate through the plasma. A portion of the electromagnetic waves with a frequency higher than the plasma frequency will deflect through the plasma. A portion of the electromagnetic waves will be absorbed in the plasma due to photons absorption. Thus, the plasma beam absorption, reflection, and deflection of a portion of incoming solar electromagnetic waves will reduce the heat striking an area of Earth. In addition, trapped dust around the satellite will block light and electromagnetic weaves either by absorption or reflection. The dust can be deposited naturally from the solar wind or placed intentionally around the satellite.

A satellite-based, computer-controlled method for heat-conditioning an area of Earth comprises a processor onboard the satellite receiving control communications to produce a plasma beam for a specified period (start and stop times) in a day and to cover a specific area of Earth for that specified time. In response, the satellite orients to produce the desired coverage by a specified start time and the satellite begins plasma generation. The satellite reorients, as needed, to maintain coverage for the specified area. When the specified stop time is reached, the satellite stops plasma generation.

An Earth satellite configured for heat conditioning areas of Earth includes a satellite power supply, a precursor gas supply tank containing a pressurized precursor gas, and one or more double plasma beam generators coupled to the satellite power supply and the gas supply tank. Each double plasma beam generator includes opposing plasma tubes configured to receive the pressurized gas from the precursor gas supply tank, a magnetic coil assembly surrounding the opposing plasma tubes and configured to impose a magnetic field on gas in the opposing plasma tubes to form a plasma, an output nozzle connected to a distal end of each of the opposing plasma tubes, and a solenoid assembly integrated with each output nozzle, and configured to generate a closed loop magnetic field, wherein each opposing plasma tube cooperates with the output nozzle and the solenoid assembly to expand the plasma gas and trap the plasma gas within the closed loop magnetic field. The satellite includes a processor executing machine instructions to control operation of the power supply and each of the one or more double plasma beam generators, the satellite provides plasma beams for absorption, reflection, and deflection of incoming electromagnetic waves emitted by a Sun.

DESCRIPTION OF THE DRAWINGS

The detailed description refers to the following figures in which like numerals refer to like items, and in which:

FIGS. 12A and 12B are schematics illustrating Earth surface temperature control using the example Earth satellite of FIG. 3;

DETAILED DESCRIPTION

Figure 1:
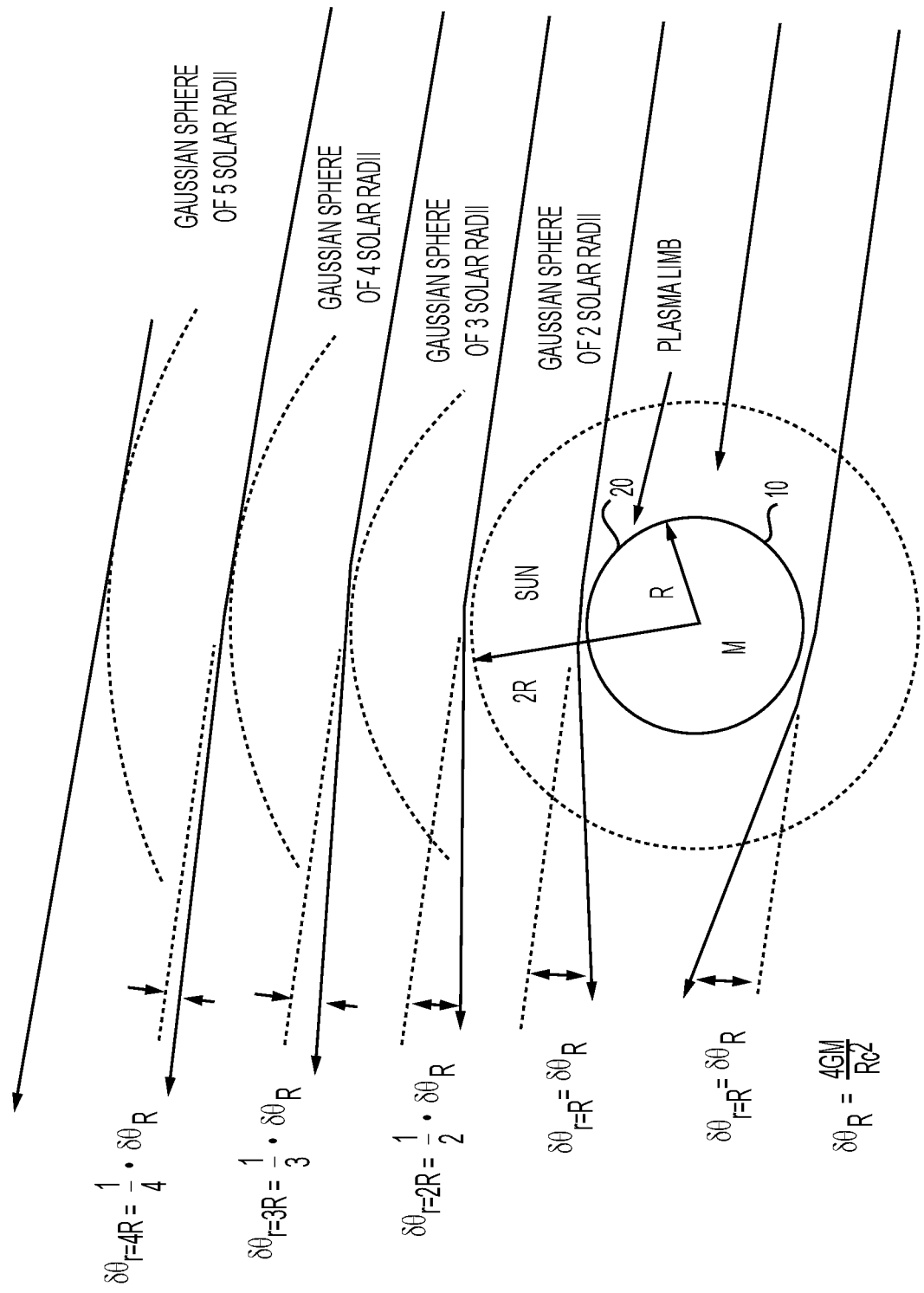
FIG. 1 illustrates the natural phenomena of solar limbs.
Figure 2:
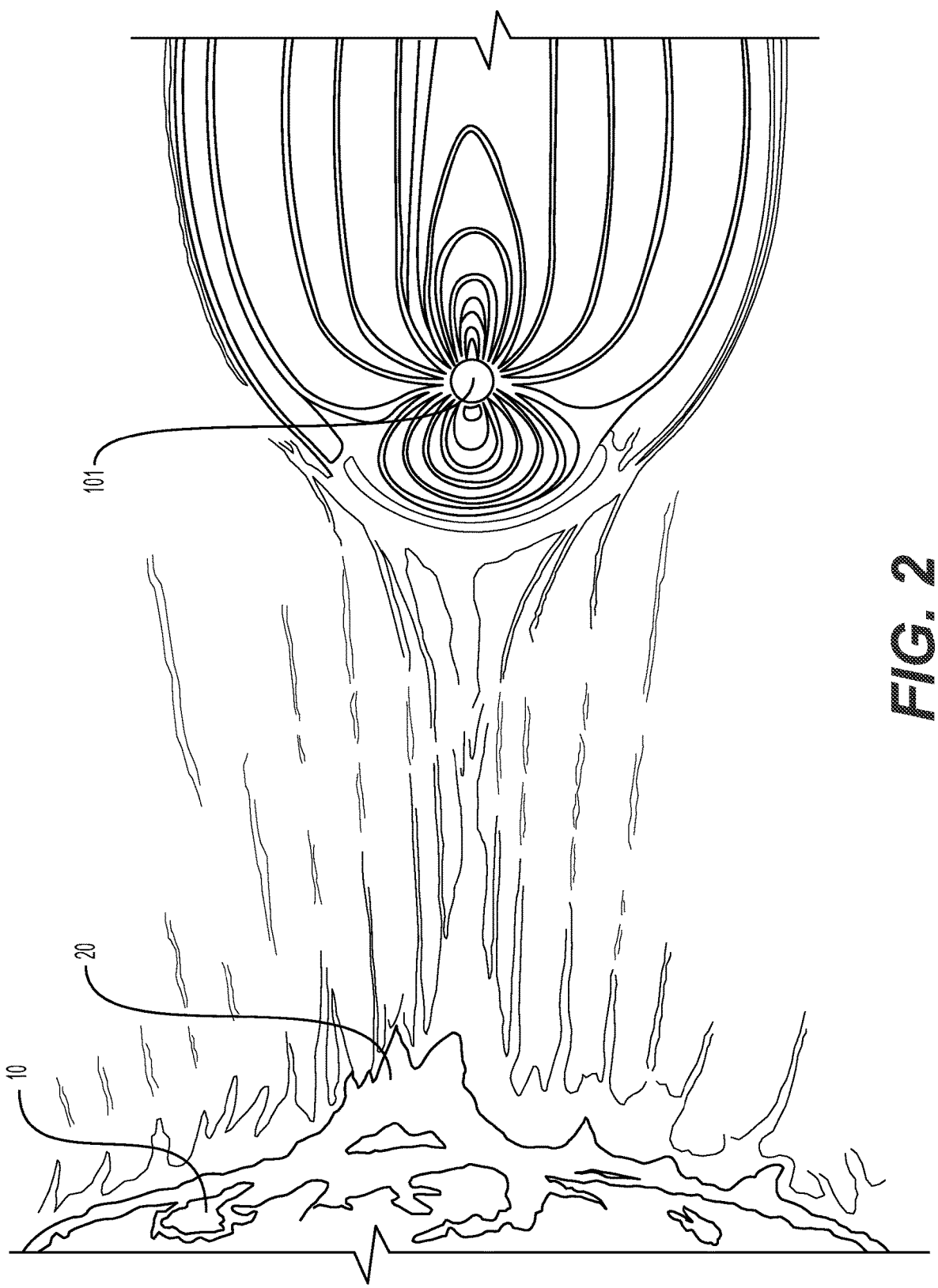
FIG. 2 is a representation of Earth-Sun magnetic flux connection.

Plasma at an astronomic distance can cause absorption, reflection, and deflection of the heat and light electromagnetic waves coming from the Sun. FIGS. 1 and 2 illustrate the formation of solar limbs (see FIG. 2, solar limbs 20 emanating from Sun 10 and producing electromagnetic waves reaching Earth 101). A satellite in Earth orbit or a ground station may be able to affect the temperature of areas on the Earth's surface by absorbing, reflecting, or deflecting a portion of the same electromagnetic waves. In an aspect, a satellite may generate plasma beams mimicking the Sun's plasma limb and direct the plasma beams to a point between the Earth 101 and the Sun 10 to induce absorption, reflection, and deflection of the solar electromagnetic waves, thereby affecting and controlling temperature control of an area of the Earth's surface. To accomplish this temperature control, such a satellite or ground station may generate a plasma cloud with a sufficiently high electron density so as to cause the desired absorption, reflection, and deflection of incoming solar electromagnetic waves. Absorbing, reflecting, and deflecting a portion of the incoming electromagnetic waves means there will be a specific area on Earth 101 that receives less solar energy.

Disclosed herein is a satellite system that may be employed to affect (reduce) temperature of areas on Earth. The satellite system may include a single satellite or multiple satellites (e.g., a satellite constellation)' the satellite or satellites may operate in one of several orbits. Different orbits may offer different advantages when employed by the herein disclosed satellite system. Examples of such orbits are geosynchronous orbits, geostationary orbits (GEO), and low Earth orbits (LEO); other possible orbits include medium Earth orbits (MEO), Polar orbits, which include sun-synchronous orbits (SSO), and Lagrange points (L-points) orbits. Medium Earth orbits may be employed by a constellation of multiple satellites performing the heat conditioning as the MEO satellites do not have to take a specific path around the Earth. Polar synchronous orbits may be useful for satellites or constellations of satellites moving between poles while maintaining their position with reference to the sun. Beside these "traditional" Earth orbits, Lagrange points (L-points) allow for satellites that are in orbits that are over a million kilometers from Earth and that do not orbit Earth directly. These L-points are far out in space where the gravitational fields of the Earth and the Sun combine in such a way that the satellite maintains a stable orbit around the L-points and thus may be anchored relative to the Earth. L-point orbits over a million kilometers from the Earth may enhance the effect of electromagnetic wave absorption, reflection, and deflection and therefore, increase the heat conditioning effect (i.e., cooling) of an area on Earth. Thus, use of L-point orbits has the potential to allow a scaleup design that covers a larger area on Earth than may be possible with traditional Earth orbits. Such L-point orbiting satellites may be useful for combating global warming in addition to targeting a specific Earth area. Similar to the Lagrange points orbit, a satellite or spacecraft on a path from the Earth to the Sun may provide coverage for large areas on Earth. These orbits are discussed in more detail herein. Finally, the satellite system may include a ground control station, which in turn may include a satellite tracking system and a satellite communications system by which individual satellites are controlled, and by which the ground station may receive data from the individual satellites.

Figure 3:
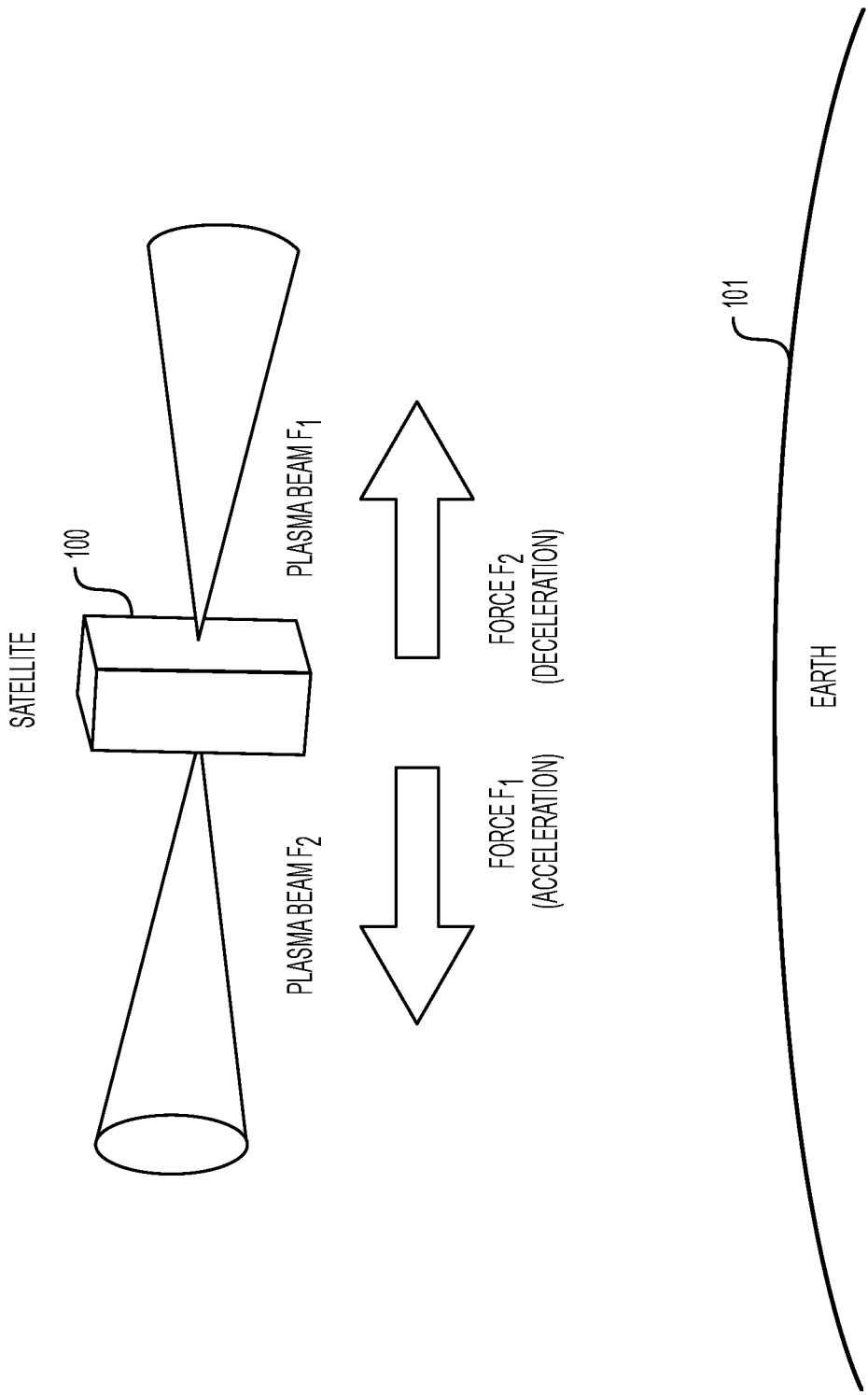
FIG. 3 illustrates an example Earth satellite configured to generate plasma beams.

FIG. 3 illustrates an example Earth satellite configured to generate plasma beams. In FIG. 3, Earth satellite 100 is shown orbiting Earth 101 at velocity V. In an example deployment, satellite 100 is in geosynchronous Earth orbit (GEO) and follows an inclined orbit around Earth 101. In this example geosynchronous orbit, satellite 100 is at an altitude of about 36,000 kilometers with an orbital period of 23 hours, 56 minutes, and 4 seconds. Satellite 100 is subject to centrifugal forces that are balanced by gravitational force. Satellite 100 is shown emitting two plasma beams, F2 and F1, which induce deceleration and acceleration, respectively, as long as the plasma beams are directed along the orbital path of satellite 100. To maintain geosynchronous (inclined) orbit, satellite 100 may compensate for any effects placed on its orbital mechanics by emission of the plasma beams F1 and F2. During plasma generation, forces F1 and F2 cancel each other and keep the satellite 100 stable. In an aspect, satellite 100 employs steerable nozzles that may use the same plasma generation features for satellite movement and maintenance of orbit, as well as the herein disclosed solar radiation absorption/reflection/deflection operations. While satellite 100 may operate in geosynchronous orbit, satellite 100 also could operate in in other orbits such as low Earth orbit (LEO). Furthermore, FIG. 3 illustrates a single satellite 100. However, in an aspect, a constellation of (i.e., multiple) Earth satellites 100 may be employed to control the heating of a specific location on Earth; such heat conditioning may take into account, and the Earth satellite controlled, based on, for example, the area to be controlled and the geographic complexity (e.g., topography) of the area. Earth satellite 100 also may be employed to affect the surface temperature of an area of an ocean or a sea. Finally, Earth satellite 100 may be employed to affect the heating of a specific Earth structure such as a building.

In FIG. 3, Earth satellite 100, as opposed to a ground station, is used to control local heating from incident solar radiation. Use of a satellite (e.g., Earth satellite 100) for this purpose has advantages. First, technology may not be sufficiently advanced to allow temperature control (i.e., heat conditioning) through the operation of a ground station; however, were that technology to be developed, it is anticipated that similar principles as those disclosed herein for a satellite-based heat conditioning could be used for a ground installation. Second, a satellite-only based system operates irrespective of Earth weather patterns or objects between the satellite and the intercepted solar radiation. Third, a satellite-only based system may require lower power for operation than would a ground station. However, power requirements and maintenance may be more of a concern for a satellite-only system than for a ground station. On balance, and considering its likely operational profile of Earth satellite 100, may be superior to a ground station for heat conditioning.

Figure 4:
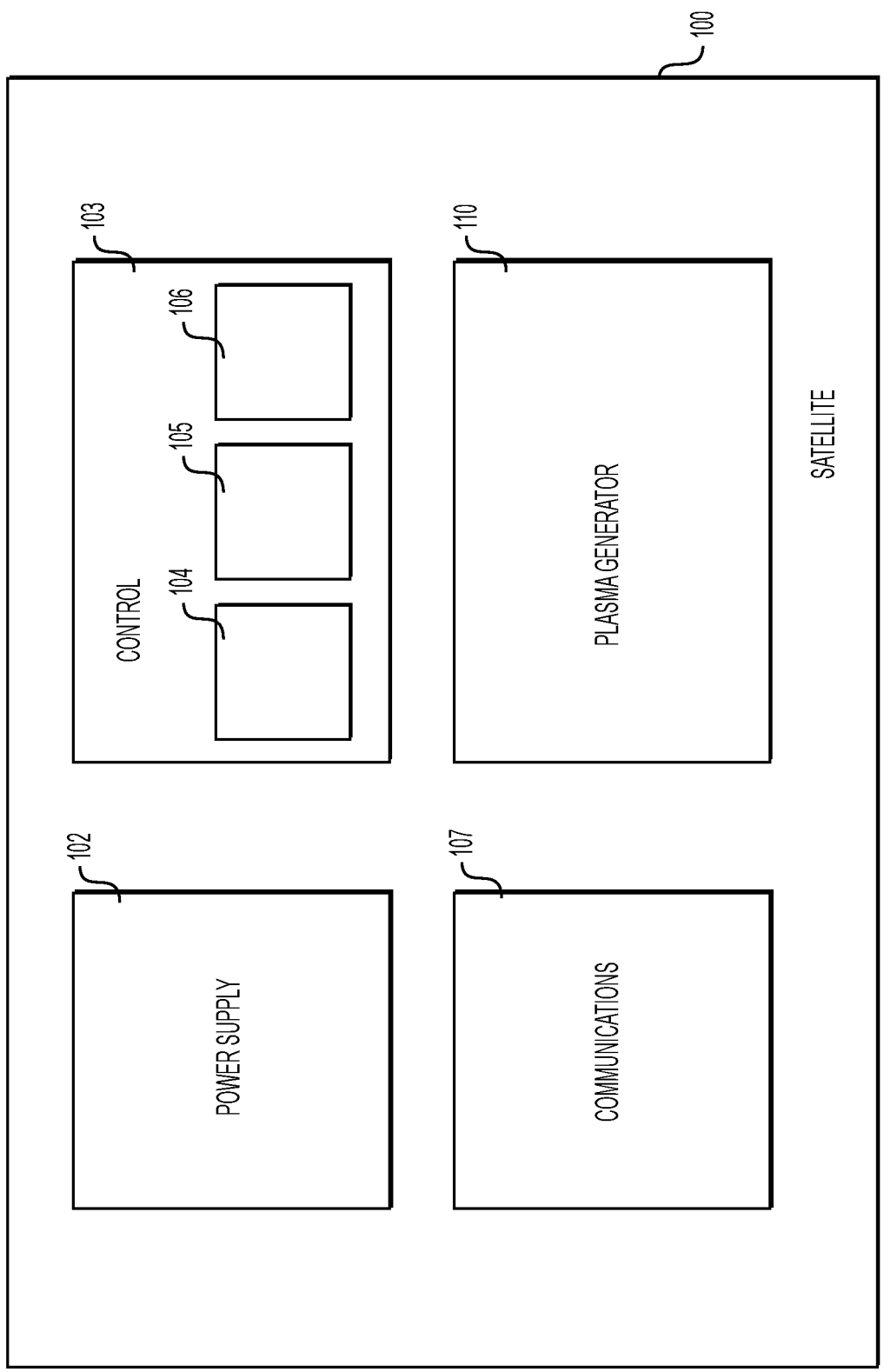
FIG. 4 is a block diagram of the Earth satellite of FIG. 3.

FIG. 4 is a block diagram of the example Earth satellite 100 of FIG. 3. Earth satellite 100 includes a power supply 102; a control system 103, which in turn includes processor 104, non-transitory, computer-readable storage medium 105, and, optionally, orbital control system 106; communications system 107; and a plasma generator (system) 110. The plasma beam generator (system) 110 is described herein including with respect to FIGS. 5 and 6. The power supply 102 may be any suitable satellite-based system. For example, the power supply 102 may be a solar-powered system with deployable solar panels and appropriate conversion equipment. In another example, power supply 102 may be a thermal engine powered, for example, by plutonium 238 (PU-238). In yet another example, power supply 102 may employ both solar and heat engine (e.g., nuclear) power sources. Processor 104 executes machine instructions stored in medium 105 to control all aspects of satellite operation, including controlling power supply 102, orbital control system 106, communications system 107, and plasma beam generator (system) 110. The orbital control system 106 may include attitude and altitude components (not shown) to adjust the orbit of satellite 100. The communications system 107 permits communications between satellite 100, other space-based vehicles, and an Earth station.

Figure 5:
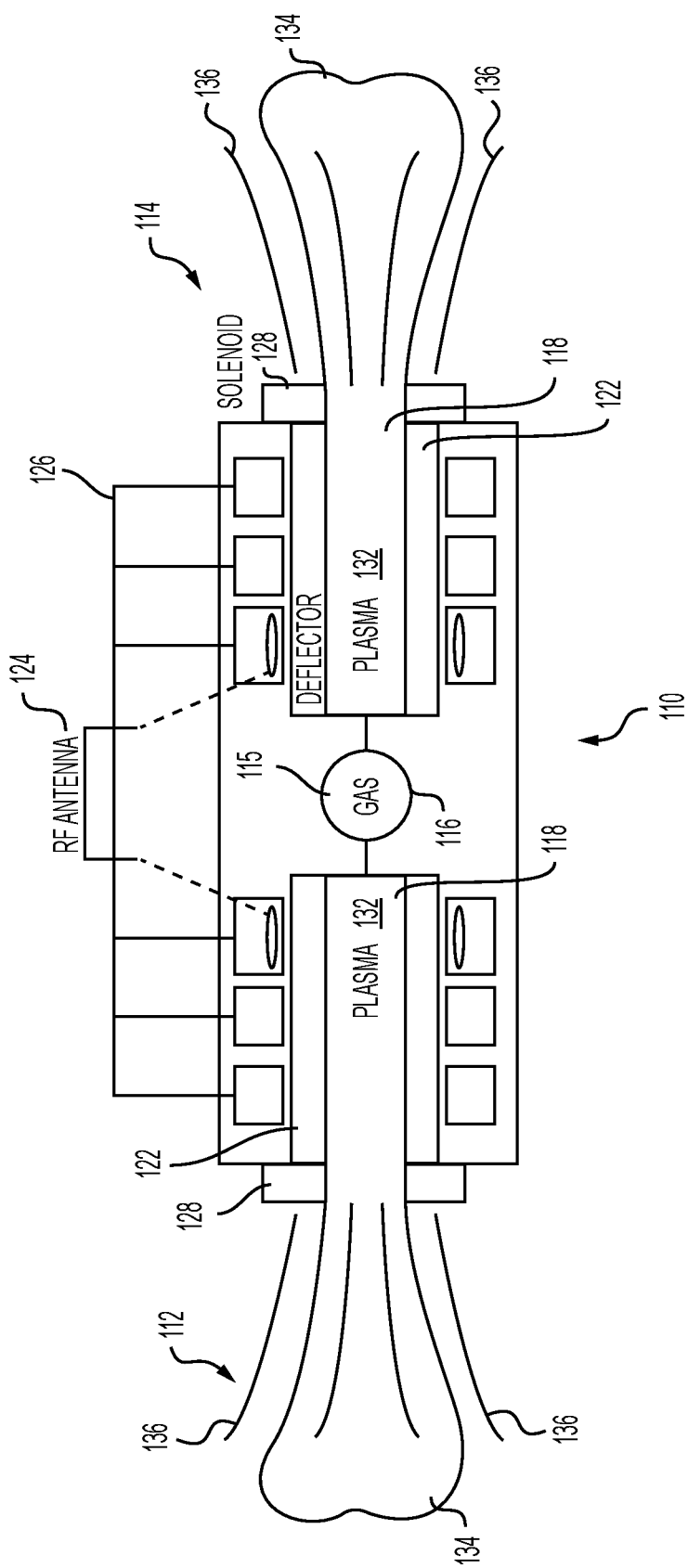
FIG. 5 illustrates components of the example Earth satellite of FIG. 3.

FIG. 5 is a schematic, illustrating components of the example Earth satellite 100 of FIG. 3. The schematic illustrates a plasma beam generator 110 configured as a double helicon plasma beam generator. Double helicon plasma beam generators are known (see Reference [1], for example. The plasma beam generator 110 includes opposed nozzle structures 112 and 114 through which plasma 132 is emitted. Each nozzle structure 112, 114 may be fixed or steerable, and may be, or incorporate, a magnetic component configured to generate magnetic fields at the nozzle exits. When steerable, the nozzle structures 112, 114 may be operated by a computer-controlled motor (not shown in FIG. 5), or a similar device. In an alternate aspect, control of magnetic fields at the exit of structures 112 and 114 may provide some directionality to the exiting plasma 132. In an aspect, the nozzle structures 112 and 114 are operated first to provide the exiting plasma 132, and second to counteract the effect of that exiting plasma 132 to maintain the position of the Earth satellite 100. Gas 115 used to produce the plasma is stored in pressurized gas tank 116. In an aspect, the gas tank 116 may be configured to be refillable. The gas 115 may be argon, $CH_4$, $CO_2$, hydrogen, krypton, nitrogen ($N_2$) $N_2O_3$, neon, xenon, or any other suitable gas. Each nozzle structure 112 and 114 includes a tube 118 that is encapsulated in deflector 122. The plasma beam generator 110 further includes a helical radio frequency (RF) antenna 124 surrounding a length of the nozzle structure 112 and 114 as well as magnetic coils 126, surrounding deflectors 122. The magnetic coils induce a magnetic field in the plasma beam generator 110. Finally, solenoids 128 are positioned at ends of the plasma beam generator 110 and are used in part to shape the exiting plasma 132 to form plasma beams 134 by generating magnetic field lines 136. In an aspect, the solenoids 128 are operated to form closed loop magnetic field lines (see, for example, FIG. 8).

In operation, the double helicon plasma beam generator, as the name implies, generates a helical wave plasma 132 and ejects the plasma 132 at a high velocity. More specifically, pressurized gas 115 hi gas tank 116 is injected into tube 118. Under the control of processor 104 (see FIG. 4), high-frequency RF power is supplied to helical RF antenna 124. The helical RF antenna 124 emits an electromagnetic wave that causes the gas 115 in tube 118 to break down and form plasma 132. Continued emissions from the helical RF antenna 124 then excite a helical wave in the plasma 132, which further heats the plasma 132.

The solenoids 128 may operate to accelerate the plasma 132 exiting the tube 118 to high and even supersonic speeds by generating at the tube exit, an electric double layer, which is in effect, a region undergoing an increase in magnetic potential (or, alternately, a constant magnetic potential) inside the tube 118 imposed by the magnetic coils 126 and the solenoids 128 followed by a sudden drop hi magnetic potential (a rapidly expanding magnetic field) as the plasma 132 exits the tube 118, That is, the solenoids 128 are used to shape the expanding plasma 132 as it exits the tubes 118, As an alternative to the solenoids 128, permanent magnets may be employed. Thus, tube 118 and solenoid 128 may mimic a converging/diverging nozzle structure such as those used to produce supersonic flows in gasses. Other mechanisms may be used to accelerate the plasma 132 as it approaches the exits of tubes 118 and to shape the plasma 132 as it expands. The result of these acceleration/deceleration changes transforms the high-density plasma 132 inside tubes 118 to a lower density plasma beam 134 as the plasma expands to form a plasma cloud. The lower density plasma beam 134 then may be directed to intercept incoming solar radiation. In operation, there may be a sharp boundary between the high-density plasma 132 inside tube 118, and the low-density plasma beam 134 in the exhaust; this sharp boundary is associated with a sharp change in electrical potential. The plasma 132 properties change rapidly across this boundary, which is known as a current-free double layer. The electrical potential is much higher inside tube 118 than in the exhaust, and this serves both to confine most of the electrons, and to accelerate the electrons and ions away from tube 118. Enough electrons and ions escape tube 118 to ensure that the plasma in the exhaust (in the plasma beam 134) is neutral overall, Thus, the plasma beam generator 110 has a generally constant magnetic field in tube 118 (supplied by the magnetic coils 126), but the magnetic field diverges and rapidly decreases in magnitude away from tube 118, and thus, the tube exits may be thought of as a "magnetic nozzle." The solenoids 128 then may be used to establish a desired shape of the escaping plasma by controlling the lines of magnetic flux such that the plasma beam 134 spreads out into a desired shape. Alternately, or in addition, the distal end of the tube 118 (i.e., the exit nozzle) may have an oval form, or other form, to help shape the plasma beam 134.

Figure 9:
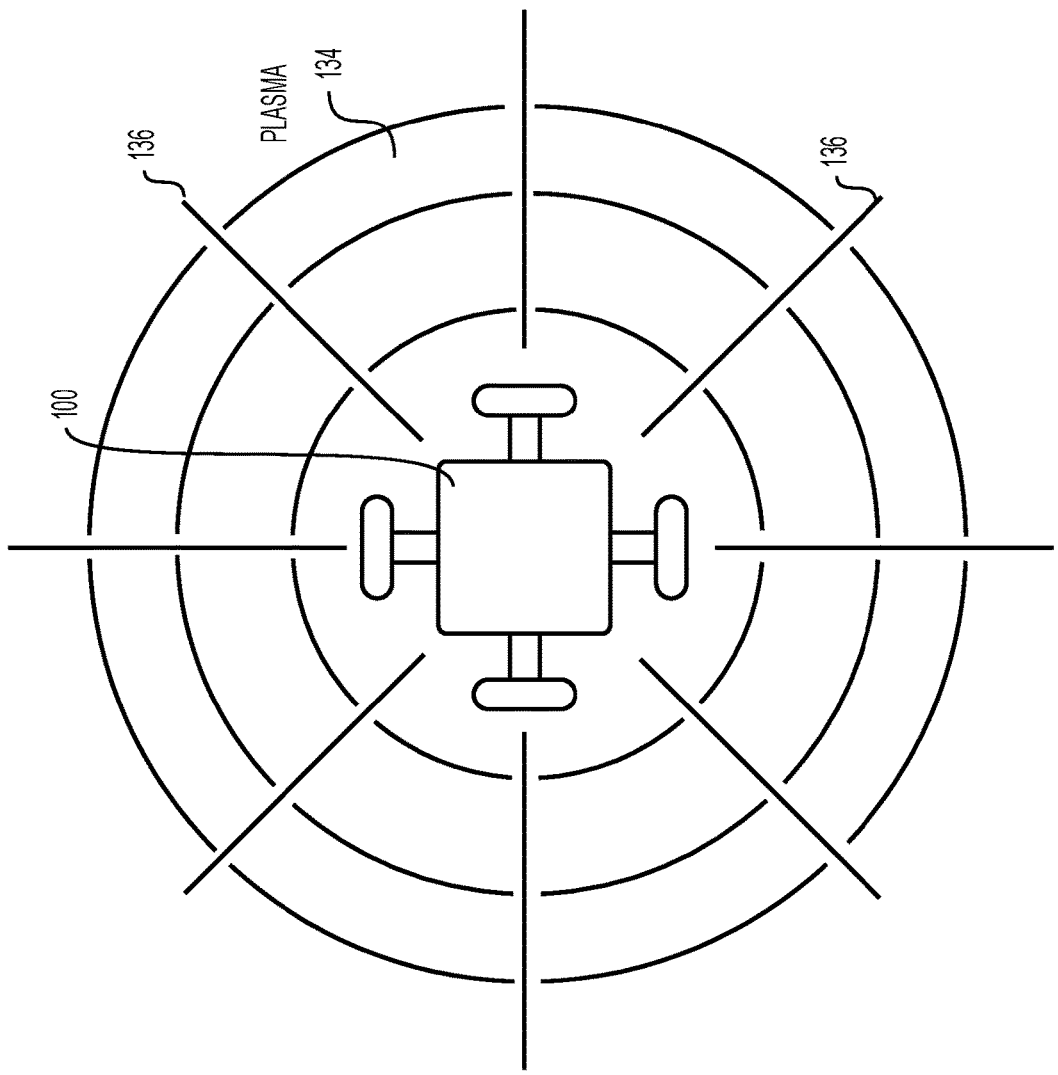
Figure 10A:
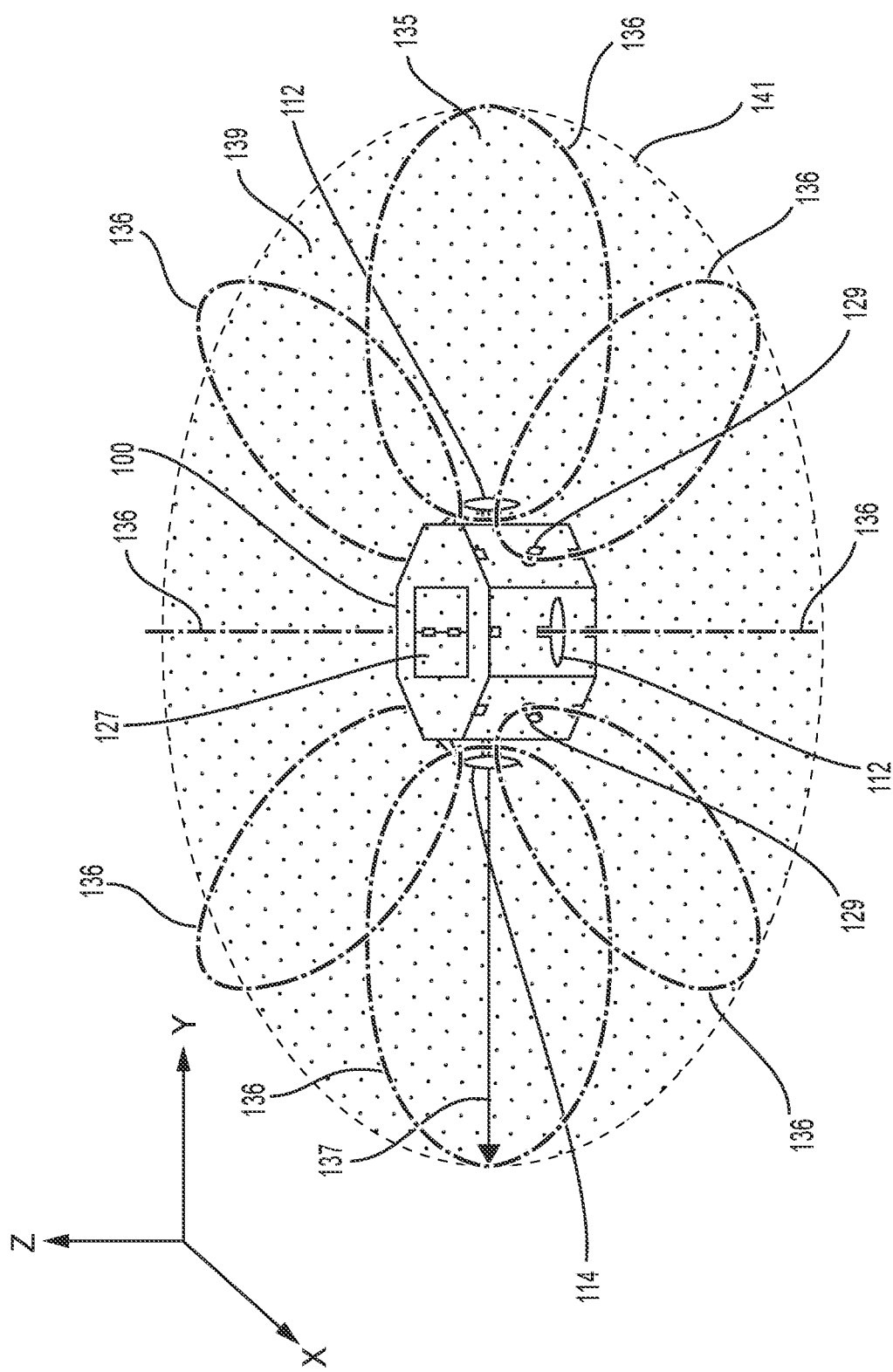
FIGS. 10A and 10B illustrate plasma beam generation using example Earth satellites.
Figure 10B:
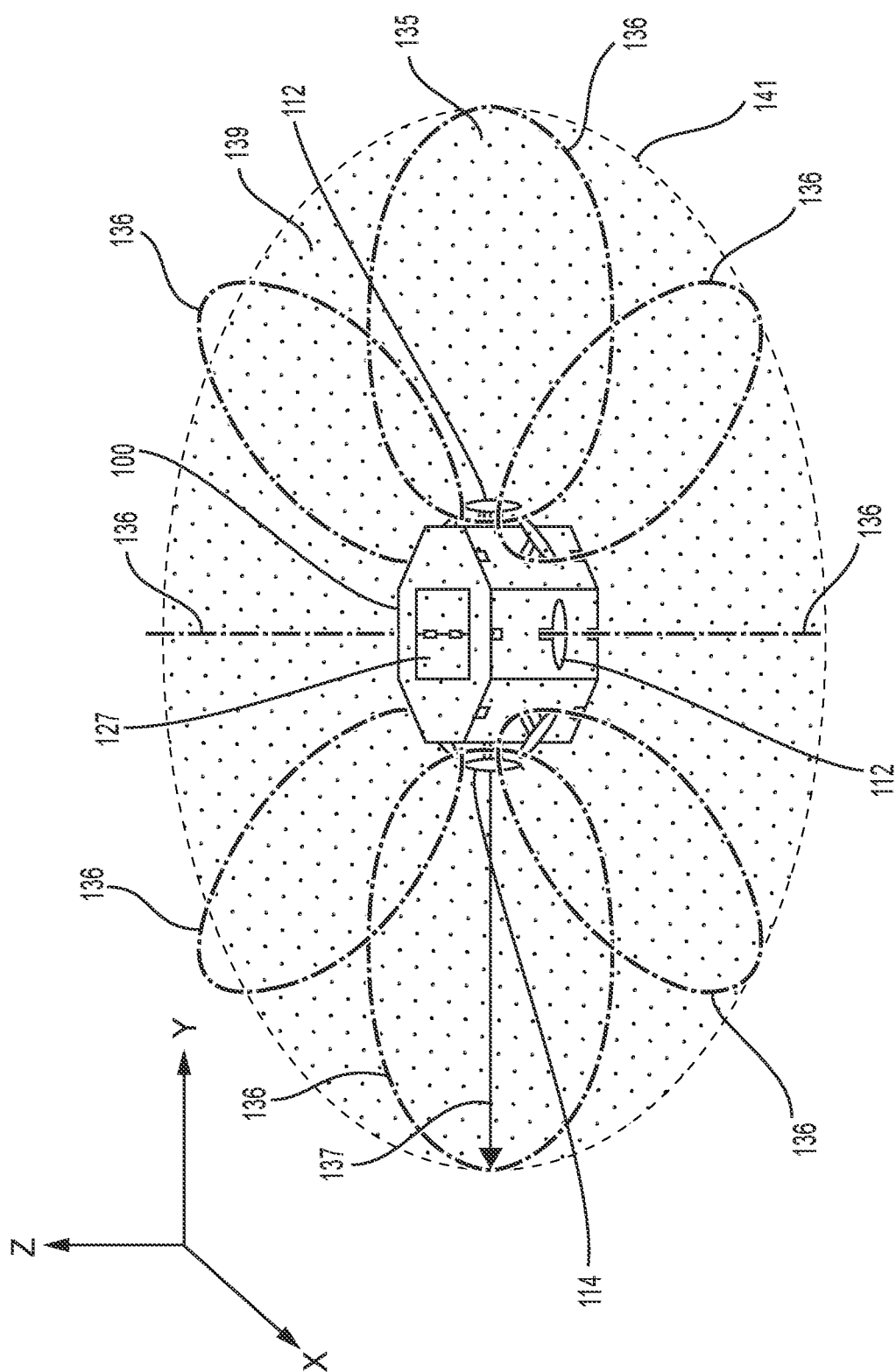

FIG. 5 illustrates one double helicon plasma beam generator. However, in other examples, Earth satellite 100 may be provided with multiple double helicon plasma beam generators. In one specific aspect, Earth satellite 100 is provided with enough helicon plasma beam generators to create an approximately disc-shaped plasma cloud surrounding the Earth satellite 100. In another aspect, Earth satellite 100 is provided with vertically-staggered or layered plasma beam generators. As can be seen in FIGS. 9, 10A and 10B, individual plasma beams may merge to provide an approximately circular ion cloud around Earth satellite 100. FIG. 9 is a top view of an example Earth satellite showing the plasma in a circular cloud. FIG. 9 also shows closed loop magnetic field lines 136, which are configured to shape and contain the plasma. FIGS. 10A and 10B, described in more detail herein, are perspective views of different configurations of Earth satellite 100.

In addition to the herein disclosed double helicon plasma beam generator, other plasma beam generators (e.g., thrusters) may be employed, including, for example, magnetoplasma dynamic thrusters, pulsed inductive thrusters, pulsed plasma thrusters, electrodeless plasma thrusters, variable specific magnetoplasma rockets (VASIMR), gridded Ion engines, hall effect thrusters, hydrazine thrusters, hydrogen thrusters, and lithium thrusters.

Figure 6:
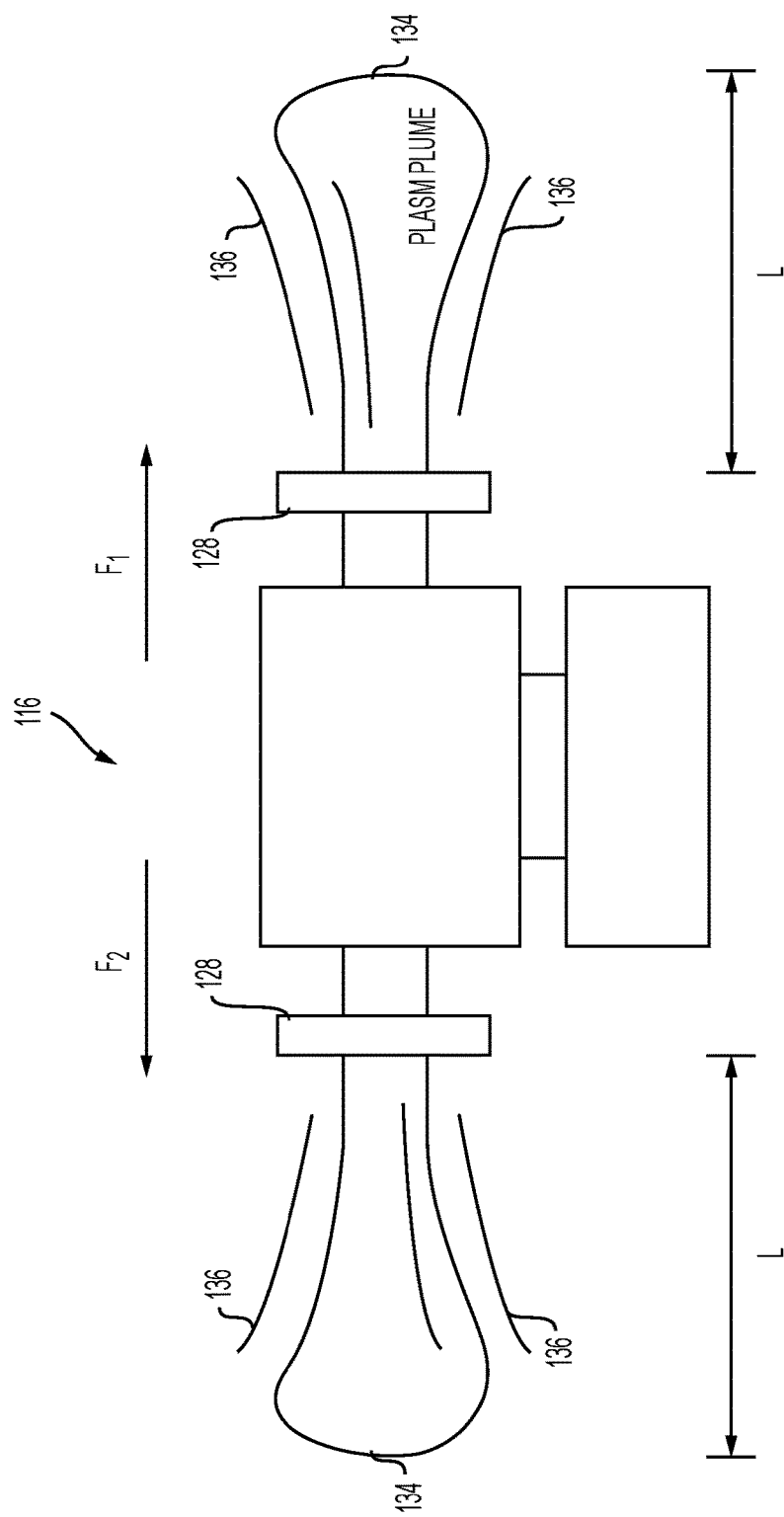
FIG. 6 illustrates additional aspects of the components of FIG. 4.

FIG. 6 illustrates additional aspects of the structural details of FIG. 5. One of the advantages of the double helicon plasma beam generator is that it generates plasma with a high electron density, which increases the plasma frequency and therefore increases the deflection and reflection of incoming electromagnetic radiation. The incoming electromagnetic radiation will not propagate if the plasma frequency is higher than that of the electromagnetic radiation. When electromagnetic radiation frequencies are higher than the plasma frequency, a portion of the electromagnetic radiation will be absorbed, reflected, and deflected by the plasma beam 134.

Figure 7:
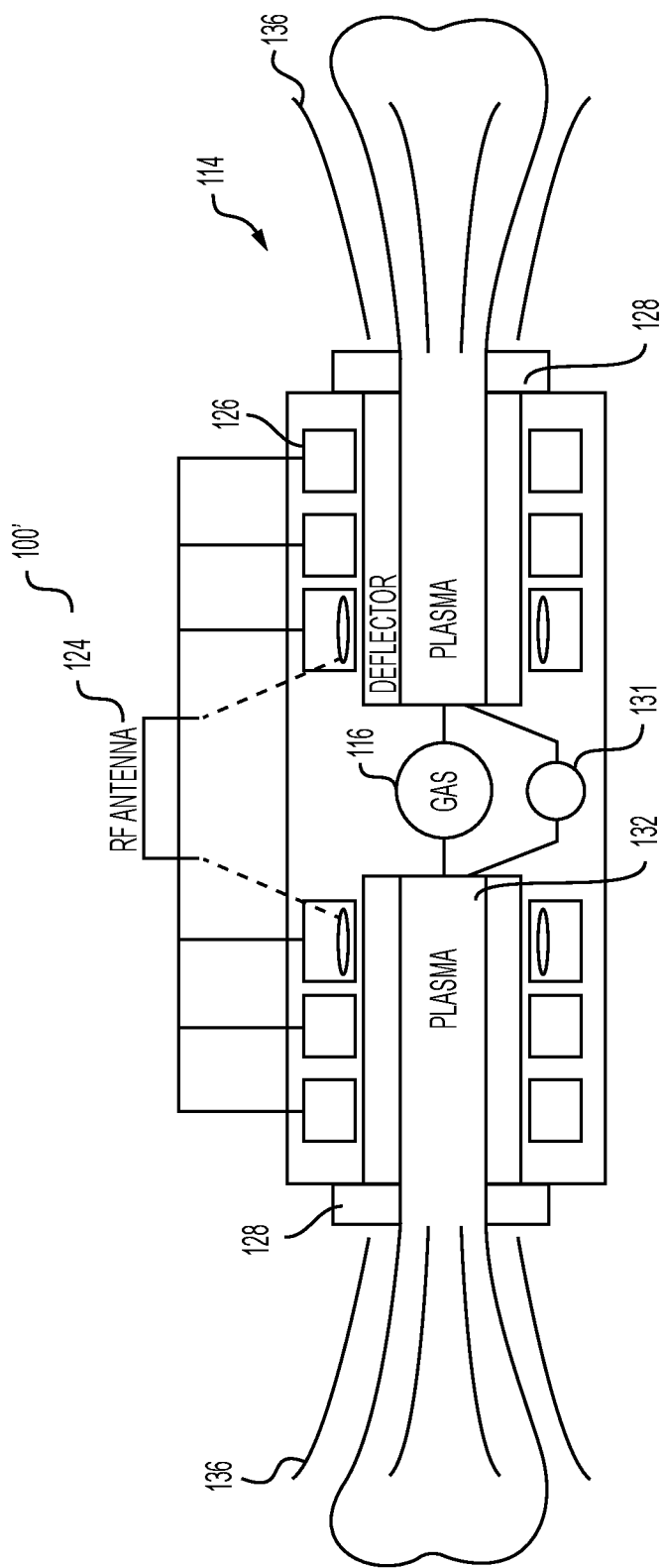
FIG. 7 illustrates an alternate version of Earth satellite of FIG. 3.

FIG. 7 illustrates an alternate version of the Earth satellite of FIG. 3. In FIG. 7, example Earth satellite 100' includes additional tank 131, which may store solids, liquids, or gasses for injection into the plasma 132. Since an objective of the Earth satellite 100' is to control heat, improving the reflection factor plasma cloud may improve the operation of the Earth satellite 100'. This improvement may be achieved by injecting solid, liquid, or gasses into the plasma 132; this additional operation mimics nature, where oxygen, nitrogen, and ozone reduce the Earth's exposure to UV light and radiation. Metals with high frequencies such as aluminum and silver also may be candidates for injection into the plasma 132 to increase the reflection factor.

Figure 8:
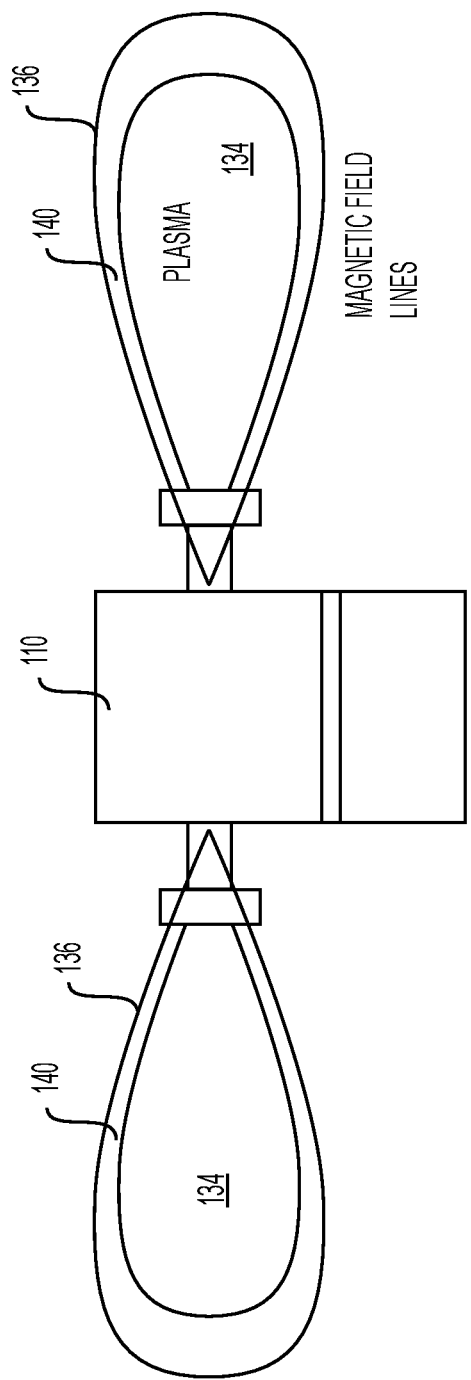
FIGS. 8 and 9 illustrate plasma beam production patterns using the Earth satellite of FIG. 3.

FIGS. 8 and 9 illustrate plasma beam production patterns using the Earth satellite of FIG. 3. FIG. 8 is a front view of a double helicon plasma beam generator 110 of an example Earth satellite that may be employed to generate plasma beams 134. In the example of FIG. 8, to conserve plasma, closed loop magnetic field lines 136 may be used; the closed loop magnetic field lines 136 trap the plasma by limiting the plasma beam 134 flow within the closed loop magnetic field lines 136 and form plasma cloud 140. This will reduce the size of the required plasma beam generator, reduce the required amount of precursor gas to generate the plasma cloud 140 and to reduce the amount of energy required to form the plasma beams 134 and subsequent plasma cloud 140. Systems, devices, and methods for generating a closed loop magnetic field are well-known to those skilled in the art; for example, U.S. Pat. No. 7,696,664 discloses such a device. In addition, (large scale) closed loop magnetic field generators have been developed as a feature of future nuclear fusion reactors. As disclosed herein, the closed loop magnetic lines 136 may be generated by running a strong current into well-designed copper coils to generate the desired magnetic field. The plasma beam 134 is made of ions and electrons, which are positively charged particles; therefore, the particles are forced to travel following the closed loop magnetic lines 136, which at least partially confine the generated plasma. FIG. 9 is a top view of an Earth satellite 100 configured with two double (i.e., opposed) helicon plasma beam generators.

Case study 1. For a plasma beam with dimensions of 500 meters (m) and 100 m (a front side area 39337.5 m^2, and top surface area 786750 m^2, and average electron density 2.333 E15), a combination of 4×500 watt-second (8.33 amps) plasma beam generators 110 will be sufficient assuming an average life of one hour for the electrons.

For case study 1, the combination of four (4) by 500 watt-s (8.33 amp-s) plasma beam generators with a top surface area of 786750 m^2, and an electron density of 2.33E15 electron/m^2 was used to assess the effect on a coverage area (i.e., the temperature-controlled area of Earth) of the plasma beam 134, with 50% of the electromagnetic light and radiation being absorbed by the plasma. Due to photons absorption by the plasma, the electron density increased to 3.95 E16 electron/m^2. Therefore, Electromagnetic waves with wavelength 2.53 E3 m will not propagate, while electromagnetic waves with a wavelength larger than 56 m will deflect outside the temperature-controlled area. Referring to Table 1B, for the time between hours 10 to 11, the temperature-controlled area temperature rose 0.33 C degree less than the surrounding area. From 11 to 12 pm the temperature-controlled area temperature rose 1.1 C degrees less than the surrounding area. From 12 to 1 pm the temperature-controlled area temperature rose 1.9 degrees less than the surrounding area. From 1 to 2 pm the impacted area temperature rose 2.47 C degrees less than surrounding area. Case study 1 showed a total difference of 5.8 C degrees less than surrounding area and corresponding to solar flux per hours from 10 to 2 pm 0.034 W/m^2, 0.055 W/m^2, 0.075 W/m^2, 0.095 W/m^2, respectively.

The amount of reflection (reflection factor) decreases once the plasma frequency is lesser than the electromagnetic frequency of the incoming electromagnetic wave. The highest natural electron density above Earth is in the ionosphere at an elevation between 300 to 400 km, where electron density is 6 E15 electron/cm^2. NASA research has shown that during a solar storm the increase of substorm 1 MeV into geosynchronous orbit produces a sudden enhancement to the radiation belt population. The sudden recovery of the density of the Outer Electron Radiation Belt (OERB) and the sudden density enhancement of the Outer Proton Radiation Belt (OPRB) are both associated with the occurrence of a substorm during the early stage of the storm when the superdense plasma sheet produces a "strong stretching phase" of the storm. These substorms are seen to inject electrons to 1 MeV and protons to beyond 1 MeV into geosynchronous orbit, directly producing a suddenly enhanced radiation belt population.

Case study 2. A satellite with two 6000-watt-s thrusters. With data used in a Japanese satellite design for space debris removal (see Reference [1]), electron density was in the range of 6 E10 to 1 E9 electron/cm^3 for the plasma beam. The average velocity was 3050 m/s, and plasma thickness was kept to a minimum. The total top surface was 1323 m^2.

The service life of the Earth satellite 100 will depend on the customer's requirements; however, it is expected that the plasma beam generators may be used during summer peak months and during daylight hours only to reserve energy and thruster fuel. Assuming 120 days a year of operation, with average of four (4) hours a day, the combination of four 500 watt-second plasma generators will require 691 kg of precursor gas, while the combination of two 6000 watt-second plasma generators will require 4146 kg of precursor gas.

Referring to FIGS. 7, 10A and 10B, the deployment of Earth satellite 100 with plasma generators and enclosed magnetic field lines 136 provides a good option in terms of: an available surface area for absorption, reflection, and deflection of incoming electromagnetic waves while at the same time conserving required power and plasma precursor gas. An added benefit is that the enclosed magnetic lines can trap dust made of gas, liquids, or solids to generate a ring around the Earth satellite 100'. The dust may be deposited directly by partially injecting material from the tank 131 (FIG. 7) of the satellite 100'. Alternatively, "solar dust" may be deposited naturally or refurbished from the solar wind that moves from the Sun to the Earth. As it passes through the plasma beam 134, the solar dust becomes positively charged. The positively charged solar dust will be trapped by the enclosed magnetic field lines 136 (see FIGS. 10A and 10B). The solar dust will be subject to forces, specifically gravitational, magnetic, tangential, and radial forces. These forces may be balanced at an imaginary line where the forces cancel each other and solar dust velocity is at a maximum. At that imaginary line, a ring of solar dust will be formed, which in appearance may be similar to a Saturn planetary ring. The presence of hydrogen-rich dust, such as polycyclic hydrocarbons, may boost (improve) satellite heat conditioning operations, since this type of deposited and trapped material is proficient in photons absorptions and generating energy. In addition, under the ultraviolet spectrum of Electromagnetic waves, the hydrogen bonds break and release both hydrogen (H⁻) and electrons, which will enhance the plasma richness and electron density. Both interplanetary dust particles (IDP(s)) and meteorites may contain material that is similar to polycyclic aromatic hydrocarbons (PAH(s)). See reference [3].

Case study 3. In case study 3, a ring made of silica of thickness 0.1 mm and covering an area of 786750 m^2 blocks 70% of light and radiation via reflection and absorption. For the time between hours 10 to 11, the affected area temperature rose 0.75 C degree less than its surrounding area, from 11 to 12 pm the affected area temperature rose 1.88 C degrees less than its surrounding area, for the time between hours, 12 to 1 pm the affected area temperature rose 2.97 degrees less than its surrounding area, from 1 to 2 pm the affected area temperature rose 3.90 C degrees less than its surrounding area, for a total difference of 9.50 C degrees less than the surrounding area during 4 hours, and corresponding to solar flux per hours from 10 to 2 pm 0.034 W/m^2, 0.055 W/m^2, 0.075 W/m^2, 0.095 W/m^2 respectively.

To support case study 3, several commercial tools are available to accurately locate the position between the Earth and the Sun and calculate the deflection in the atmosphere. Assuming the Sun, Earth, and satellite are all in the same plane (as in FIG. 11), and the satellite is providing maximum coverage at 10 am, for the satellite to continue to provide uniform coverage from 10 am to 2 pm in accordance with earlier case studies, the Vx velocity of the satellite must nearly match the Vx velocity of the earth for that duration. Since the satellite is at a longer radius than the earth, then for the same Vx velocity, the satellite will have less rotational velocity than the earth, if there is no force compensating for the satellite reduced rotation energy, the satellite orbit will get close to the earth. One potential source of energy is the plasma's rise in electron density during operation. Based on many factors, such as the targeted geographical area, the number of rotations the satellite will do, and available energy for the satellite, the most suitable arrangement may be selected. See Tables 1A and 1B below for an alternate arrangement in which the Sun, Earth, and satellite 100 are not in the same plane.

FIGS. 10A and 10B illustrate plasma beam generation using example Earth satellites. In FIG. 10A, Earth satellite 100 is configured in an octagon form, which is chosen to enhance plasma deployment. Earth satellite 100 is shown with two double helicon plasma beam generators (not shown) terminating in nozzle structures 112 and 114. As can be seen, the nozzle structures 112 and 114 are oval (elliptical). However, other shapes, including circular, may be used. On the faces of the octagon that do not include the nozzle structures 112, 114, a magnetic field front end 129 is illustrated. The magnetic field front end 129 is coupled to a magnetic field generator (not shown) in the satellite interior. The magnetic field front end 129 and its attached magnetic field generator produce the same magnetic field as the magnetic field generators incorporated with the herein disclosed plasma beam generators such as that shown in FIG. 7, for example. The magnetic field lines 136 can be seen to enclose, and thus constrain, the plasma in a cloud 135 (the plasma represented by the dots; the magnetic field lines 136 cooperate to constrain or confine the plasma within a volume 139 represented by the dashed line 141). The volume 139 may be thought of as a donut shape with the Earth satellite 100 occupying the "donut hole." Line 137 represents the Y-axis extent of the volume 139. Dimensions of the plasma cloud 135 are disclosed in case studies 1-3, above. Also shown with the Earth satellite 100 are remotely operated doors 127, which may be opened to deploy a solar panel array (not shown) when such a solar panel array in used as a component of the satellite's power supply.

FIG. 10B illustrates Earth satellite 100 implemented with four double helicon plasma beam generators terminating with nozzle structures 112 and 114.

Figure 11:
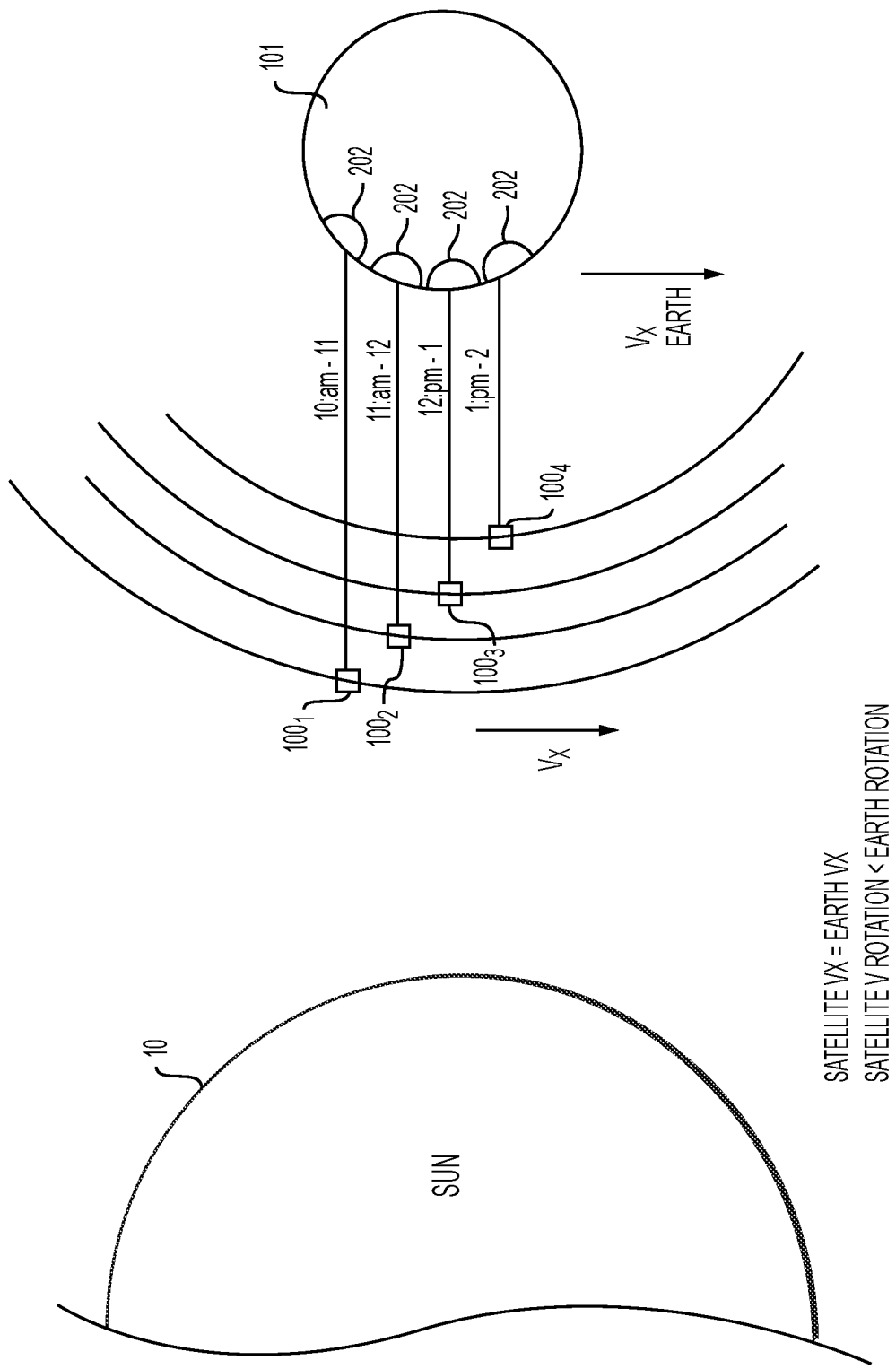
FIG. 11 illustrates an implementation of the Earth satellite of FIG. 3.

FIG. 11 illustrates an implementation of the Earth satellite 100. In FIG. 11, four Earth satellites $100_1$-$100_4$ follow approximately similar orbitals, but at varying perigees, to provide heat conditioning of area 202 as the Earth 101 rotates to expose area 202 to heating from the Sun 10. The earth satellites are shown to have an orbital velocity less that the rotational speed of the Earth 101.

FIGS. 12A and 12B are schematics illustrating Earth surface temperature control using the example Earth satellite 100 in FIG. 3. In FIG. 12A, solar radiation from the Sun's limbs moves toward Earth where it heats the Earth's surface. In FIG. 12B, satellite 100 produces a plasma beam 134 that intercepts the solar radiation and causes a slight deflection A.

Figure 13:
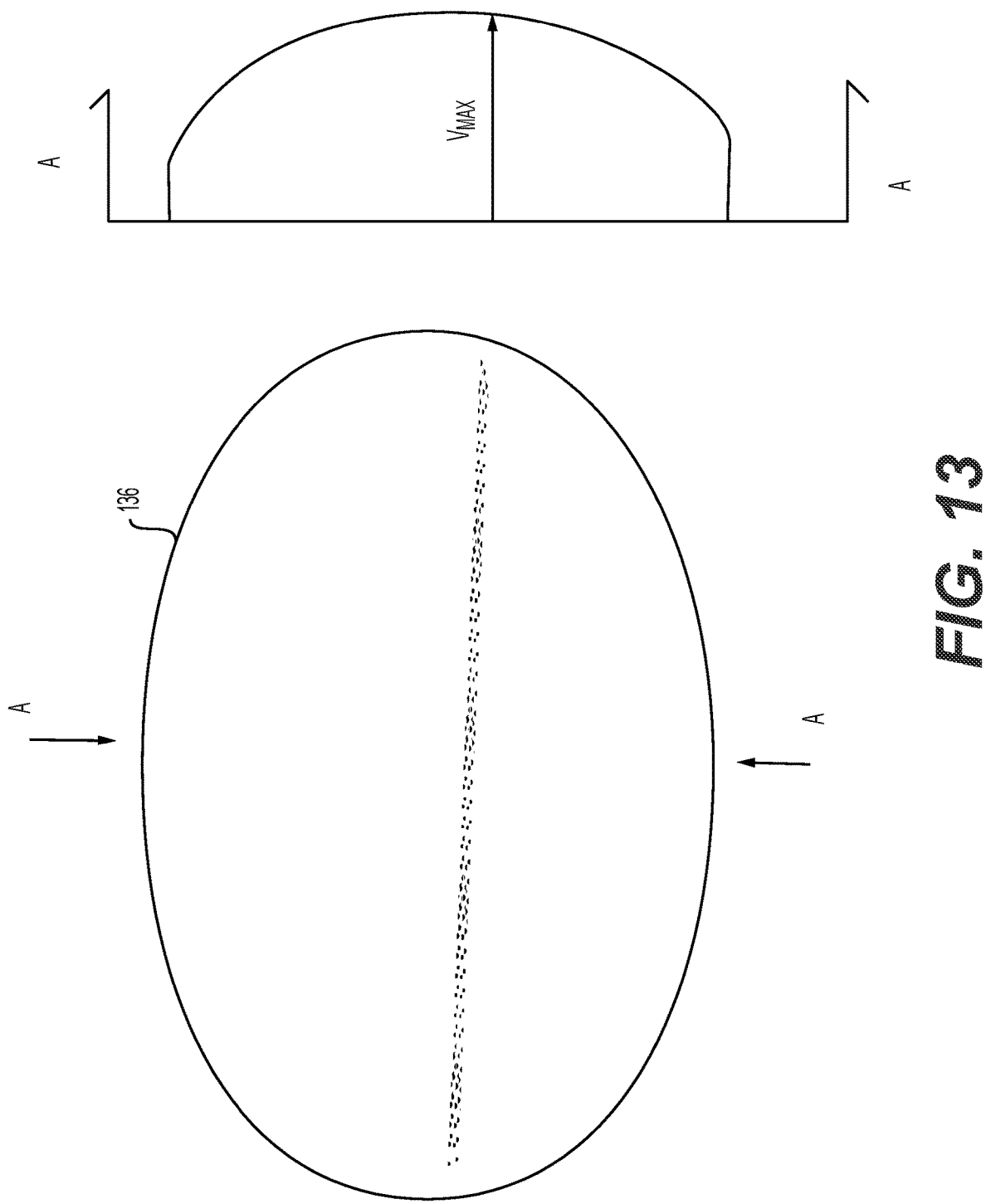
FIG. 13 illustrates an example incorporation of solid materials in a plasma beam.

FIG. 13 illustrates a dust ring 138 that may form within the confines of magnetic field line 136. The dust ring 138 may be subjected to forces which cancel each other; specifically, gravity, magnetic, radial, and axial forces may interact and cancel each other such that the dust ring is stable.

Figure 14:
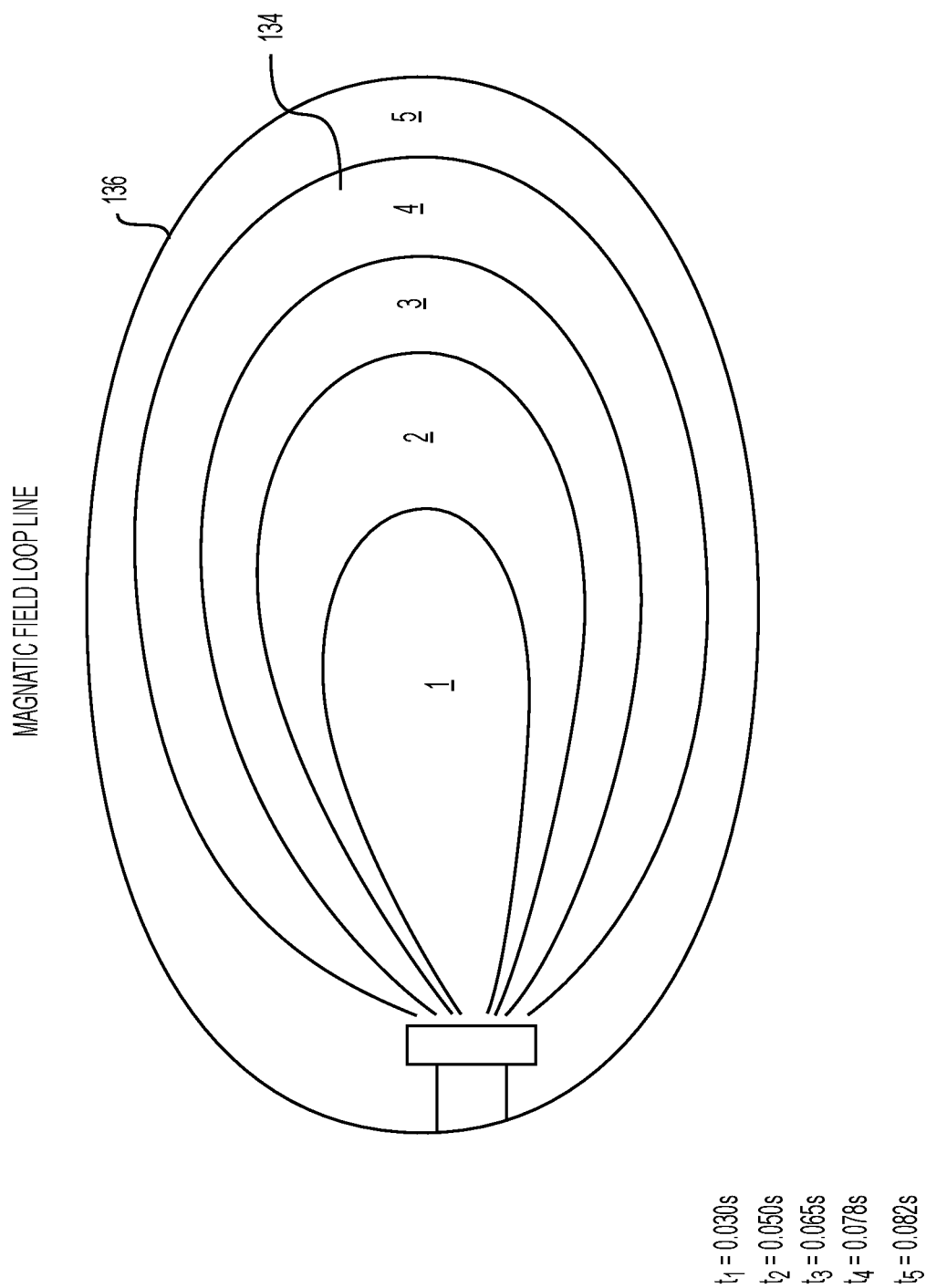
FIG. 14 illustrates an example formation of a plasma beam.

FIG. 14 illustrates an example formation of plasma beam 134 within closed loop magnetic field lines 136. As can be seen, from time t1 to t5, the plasma beam 134 forms rapidly, within less than one second.

Figure 15:
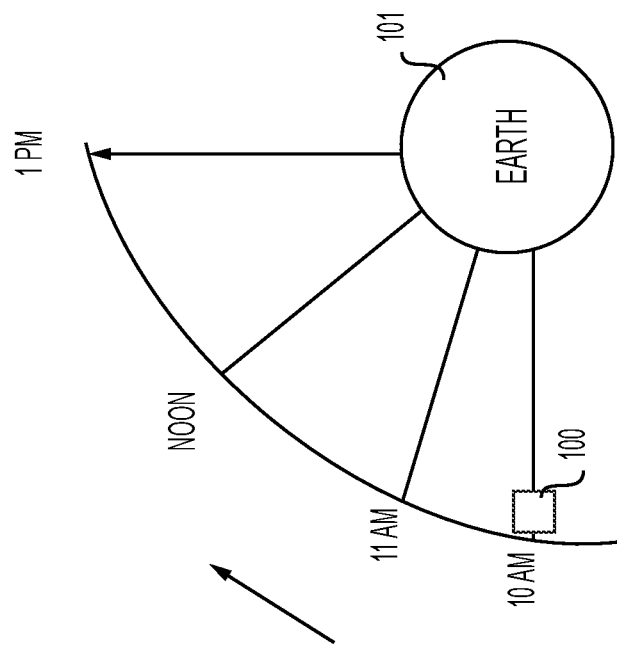
FIG. 15 illustrates aspects of an elliptical orbit used by the Earth satellite of FIG. 3.

FIG. 15 illustrates an example elliptical orbit for Earth satellite 100 showing azimuth and elevation over a four-hour period.

Figure 16A:
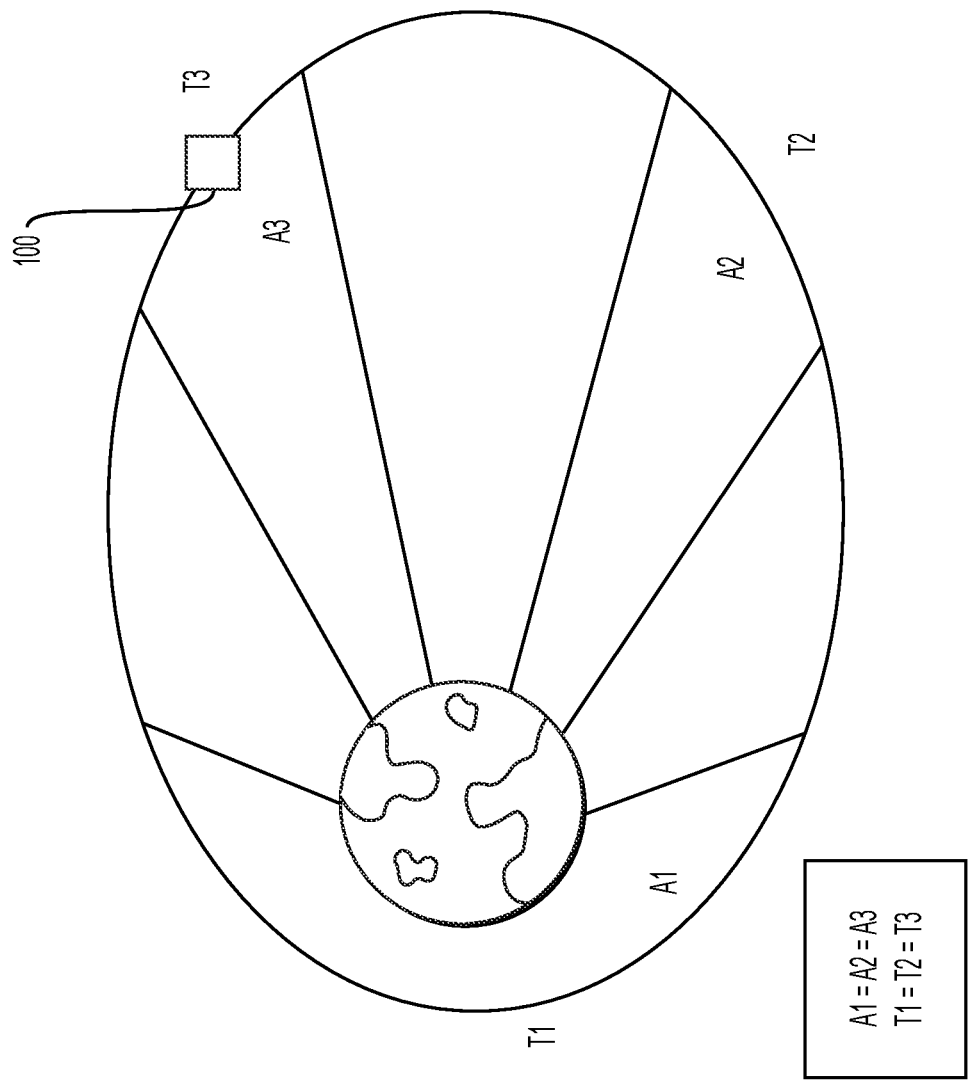
FIGS. 16A and 16B illustrate the import of Kepler's second law.
Figure 16B:
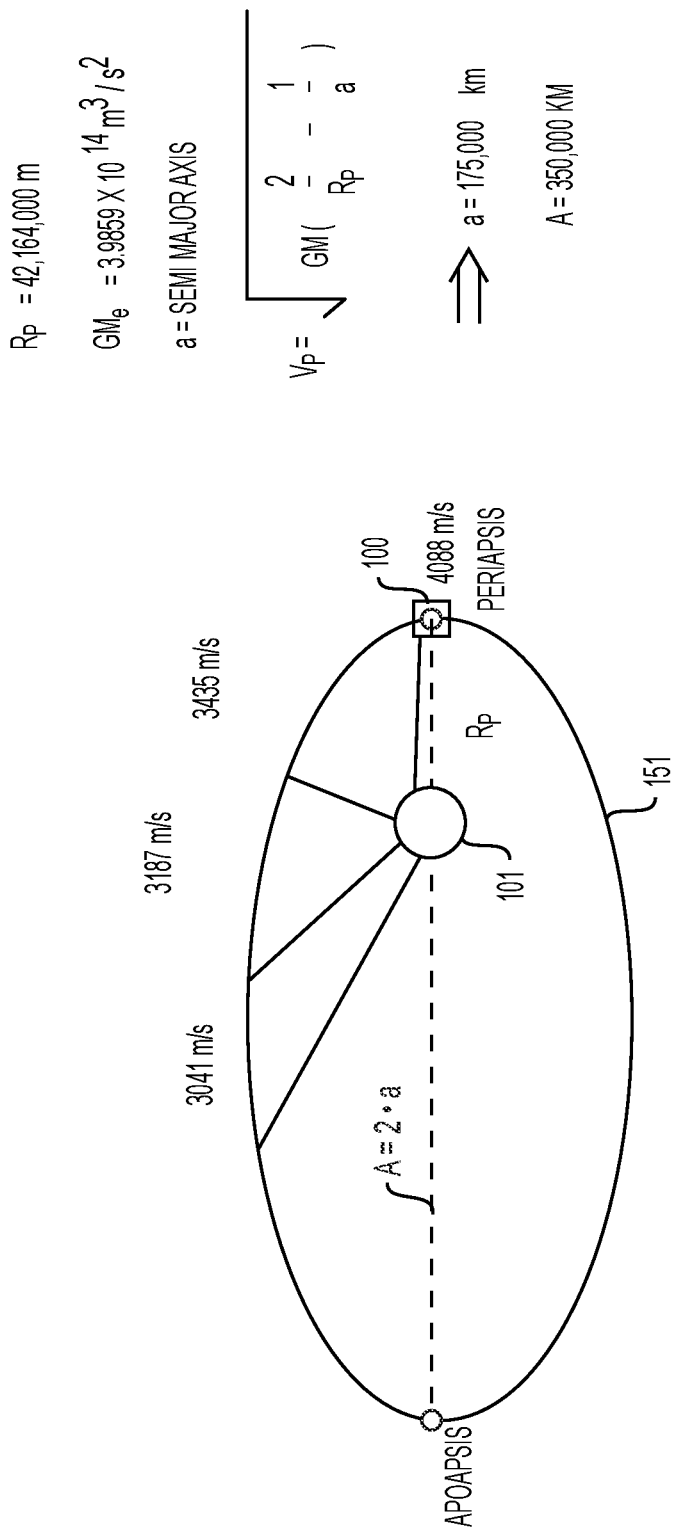

FIGS. 16A and 16B illustrate a fundamental concept encapsulated in Kepler's second law; namely, in an elliptical orbit, the time a satellite orbiting the Earth takes to transit a given area is constant. Thus, as FIG. 16A shows, in elliptical orbit with areas A1, A2, and A3 equal, the transit times T1, T2, and T3 over the orbit sections are equal. As a result, the speed of Earth satellite 100 increases as it gets closer to Earth. If time T2 is long enough to affect surface temperature, then selecting a proper elliptical orbit may produce the desired temperature reduction. This concept may be employed with any elliptical orbit, including sun-synchronous orbits.

FIG. 16B shows the speed variation of Earth satellite 100 in an elliptical orbit 151 with a semi-major axis A of 175,000 km. At periapsis, Earth satellite 100 moves with a speed of 4088 m/s. As Earth satellite 100 approaches apoapsis, it slows by 75%, and will continue to slow until apoapsis is reached.

Figure 17A:
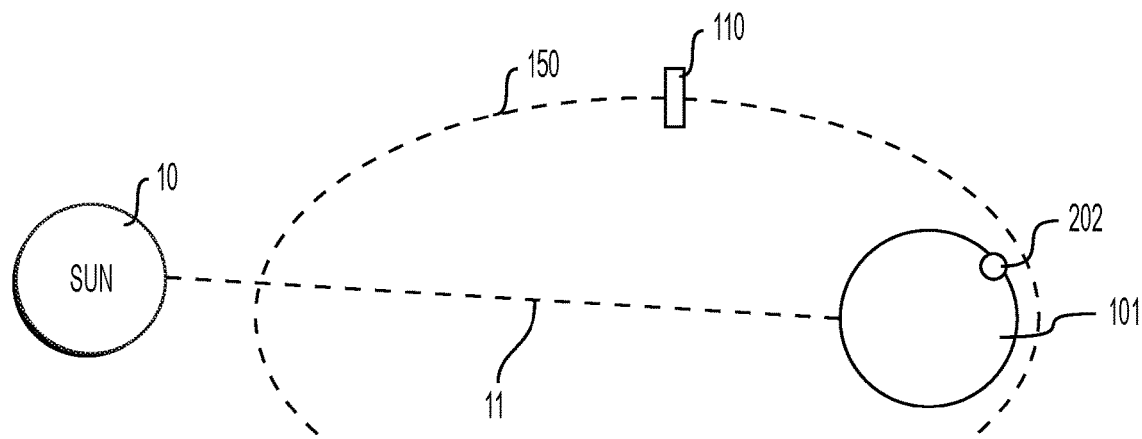
FIGS. 17A-17C illustrates an example elliptical sun-synchronous orbit.
Figure 17B:
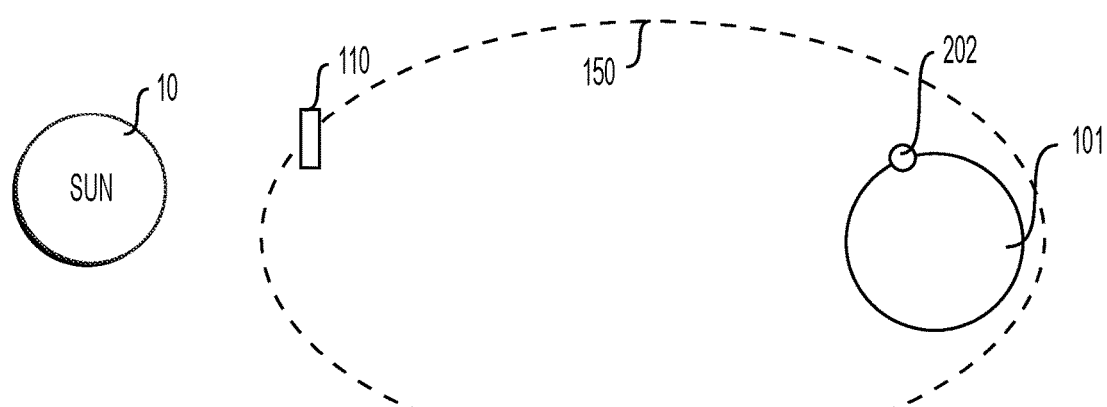
Figure 17C:
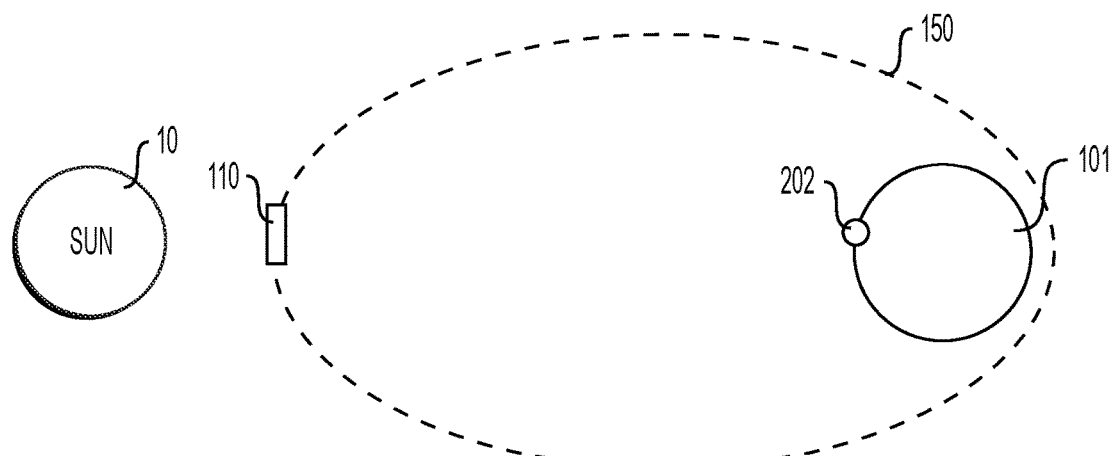

FIGS. 17A-C illustrate Earth satellite 100 in an elliptical sun-synchronous orbit 150. The dashed line 11 indicates Earth 101 is aligned with Sun 10. In FIG. 17A, Earth satellite 100 has passed perigee and moves toward apogee. Earth 101 is shown with area 202, for which temperature reduction is desired. In FIG. 17B, Earth 101 has rotated sufficiently that area 202 is receiving sunlight. In FIG. 17C, Earth 101 has rotated sufficiently that area 202 is in direct line with Sun 103 and Earth 101, but Earth satellite 100 is interposed between area 202 and Sun 10.

Figure 18:
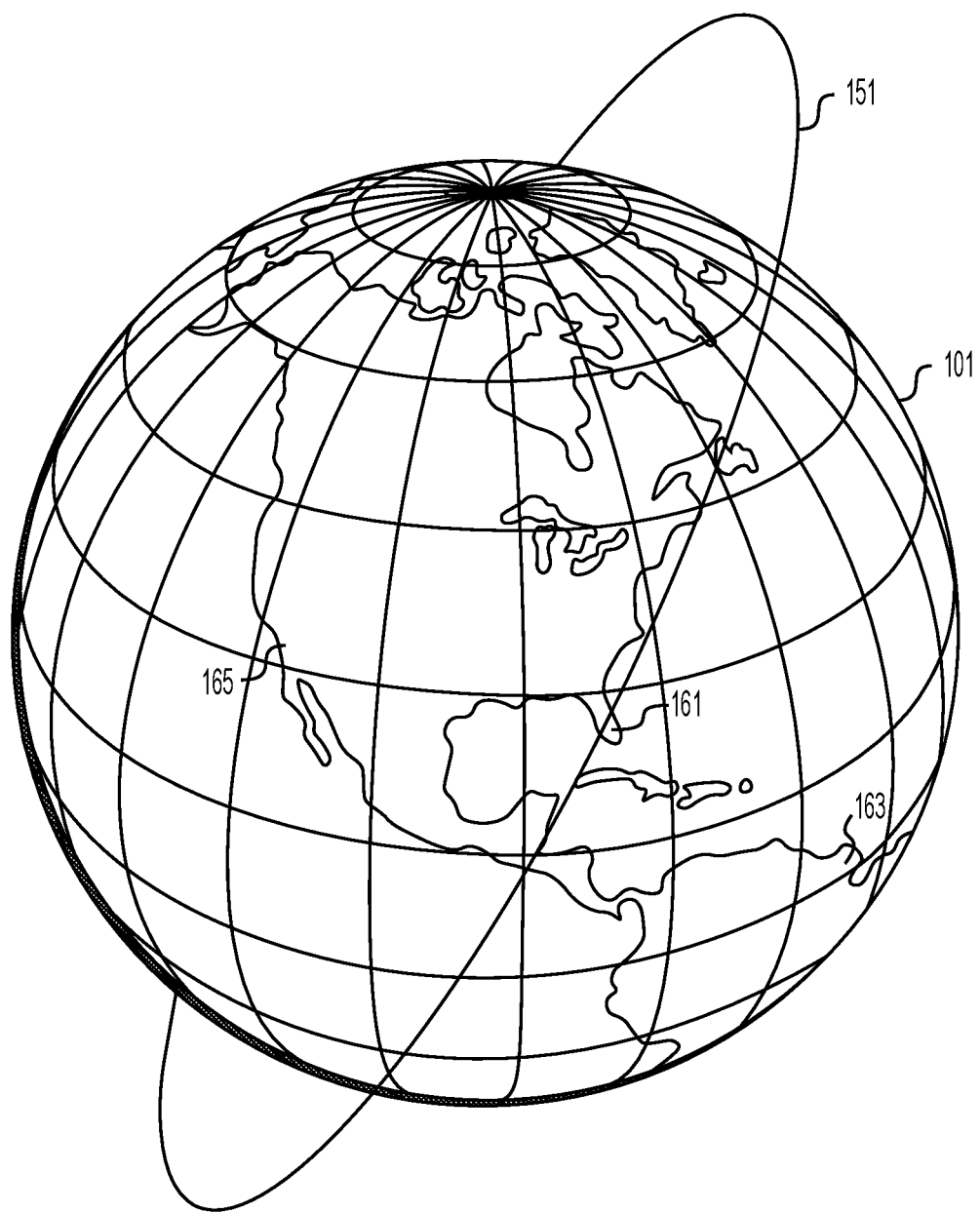
FIG. 18 illustrates an example retrograde sun-synchronous orbit.

FIG. 18 illustrates Earth 101 with North America shown in full. In FIG. 18, three launch sites 161, 163, and 165 are illustrated. These launch sites have the benefit of supporting a launch over the Atlantic or Pacific Oceans, thereby avoiding launch over land masses. Launch sites 161 and 163 may be used for retrograde sun-synchronous orbits such as orbit 151; lunch site 165 may be used for prograde sun-synchronous orbits. All three launch sites may be used for other orbits; however, launch site 165 would be used for launching a satellite in a clockwise orbit with respect to Earth 101.

Figure 19:
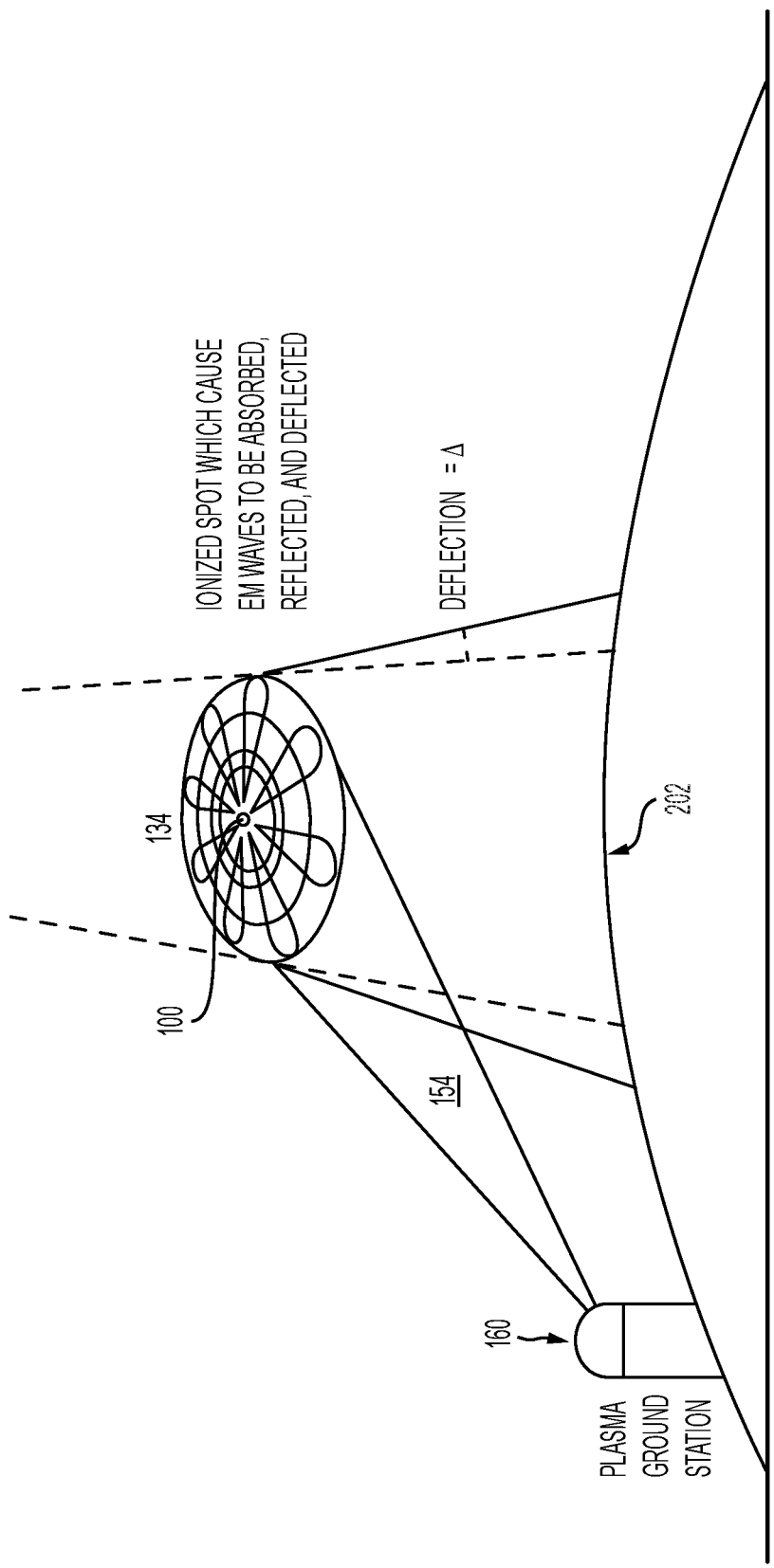
FIG. 19 is a schematic illustrating plasma beam deflection of electromagnetic waves using the Earth satellite of FIG. 3 in conjunction with a ground station-based plasma beam generator.

FIG. 19 is a schematic illustrating plasma beam deflection of electromagnetic waves using the Earth satellite of FIG. 3. The plasma beam may be generated from a ground station 160 and/or Earth satellite 100. Plasma beams 134 and 154 may be directed at a point between the Earth and the Sun to cause deflection and or reflection of heat and light electromagnetic waves. The simplified presentation of FIG. 19 does not account for atmospheric and stratospheric deflection.

Figure 20:
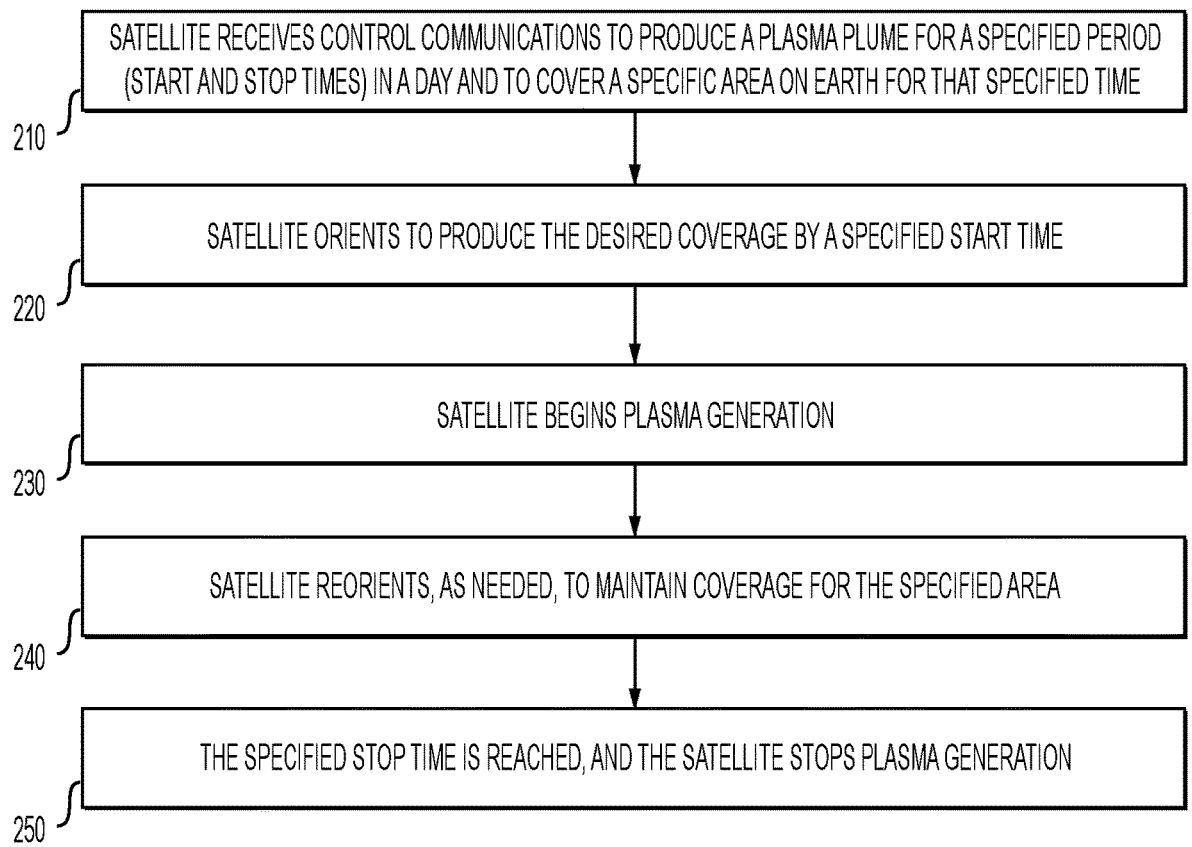
FIG. 20 is a flowchart illustrating example operations of the Earth satellite of FIG. 3.

FIG. 20 is a flowchart illustrating an example operation 200 of satellite 100 of FIG. 3. In block 210, Earth satellite 100 receives control communications to produce a plasma cloud for a specified period (start and stop times) in a day and to cover a specific spot-on Earth for that specified time. The control communications also may direct the satellite to inject solid materials in to the supplied plasma gas to enhance the heat conditioning properties of the plasma cloud. The control communications may originate within Earth satellite 100, or may originate from a ground control stations. In block 220, satellite 100 orients to produce the desired coverage by a specified start time. In block 230, satellite 100 establishes closed loop magnetic field lines 136 (see, e.g., FIG. 10A) and begins plasma beam generation. In block 240, satellite 100 reorients, as needed, to maintain coverage for the specified Earth area. In block 250, the specified stop time is reached, and the satellite 100 stops plasma generation. In addition, the satellite may end generation of the closed loop magnetic field lines 136.

As noted herein, the satellite 100 is capable of deployment in any one of the classical orbits; such orbits include low earth orbit (LOE), mid-earth orbit (MOE), circular orbit, elliptical orbit, sun-synchronous orbit, geosynchronous orbit, geostationary orbit, molynia orbit, and other orbits. These orbits have been in use for decades, and their mechanics are well known to those skilled in the art. Earth satellite 100 also may be placed into an L-points orbit. The choice of an orbit (or multiple orbits) may be determined by the satellite's intended mission. Factors to consider in launching a satellite include, inter alia, the launch location, payload weight, intended duration, satellite power requirements, and satellite servicing requirements.

In the particular application disclosed herein, the satellite mission is to provide temperature control over areas of the Earth's surface. In an aspect, the satellite mission is to be able and available to controllably reduce surface temperature over an area of the Earth. This aspect may be particularly useful between the Earth's mid-latitudes, such as, for example, between the Tropic of Cancer and the Tropic of Capricorn. However, other broad swaths of the Earth's surface may benefit for surface temperature reduction. In another aspect, the temperature control (reduction) may be intended for land areas. However, ocean surface temperatures also may be controlled (reduced) through operation of the herein disclosed satellite, satellite systems, and satellite operational methods. For example, ocean surface temperature may be used to mitigate the growth of hurricanes that typically strengthen by interaction with warm waters in the Western Atlantic and the Caribbean. Thus, selection of an area of the Earth for temperature control may be the primary factor in selecting an orbit for the herein disclosed Earth satellite 100.

In an example implementation, a single Earth satellite 100 may be used for Earth surface temperature reduction (land or water). In another example implementation, multiple Earth satellites 100 (a satellite constellation) may be used. When multiple Earth satellites 100 are used, the satellites may follow the same orbit, but spaced apart; multiple orbits of the same type (e.g., multiple elliptical orbits); multiple orbits of different types (e.g., a sun-synchronous orbit and an equatorial plane orbit; and orbits of different distances from the Earth (LOE, MOE). Furthermore, certain orbit types may be combined. For example, a sun-synchronous orbit may be circular or elliptical. Still further, an Earth satellite 100, or multiple Earth satellites 100, may change orbits or orbital parameters, within certain limitations, in some cases provided sufficient fuel or thrust capacity is available onboard the satellite. In general, any combination of orbits, orbit types, and orbit distances may be employed in a satellite constellation.

Figure 21:
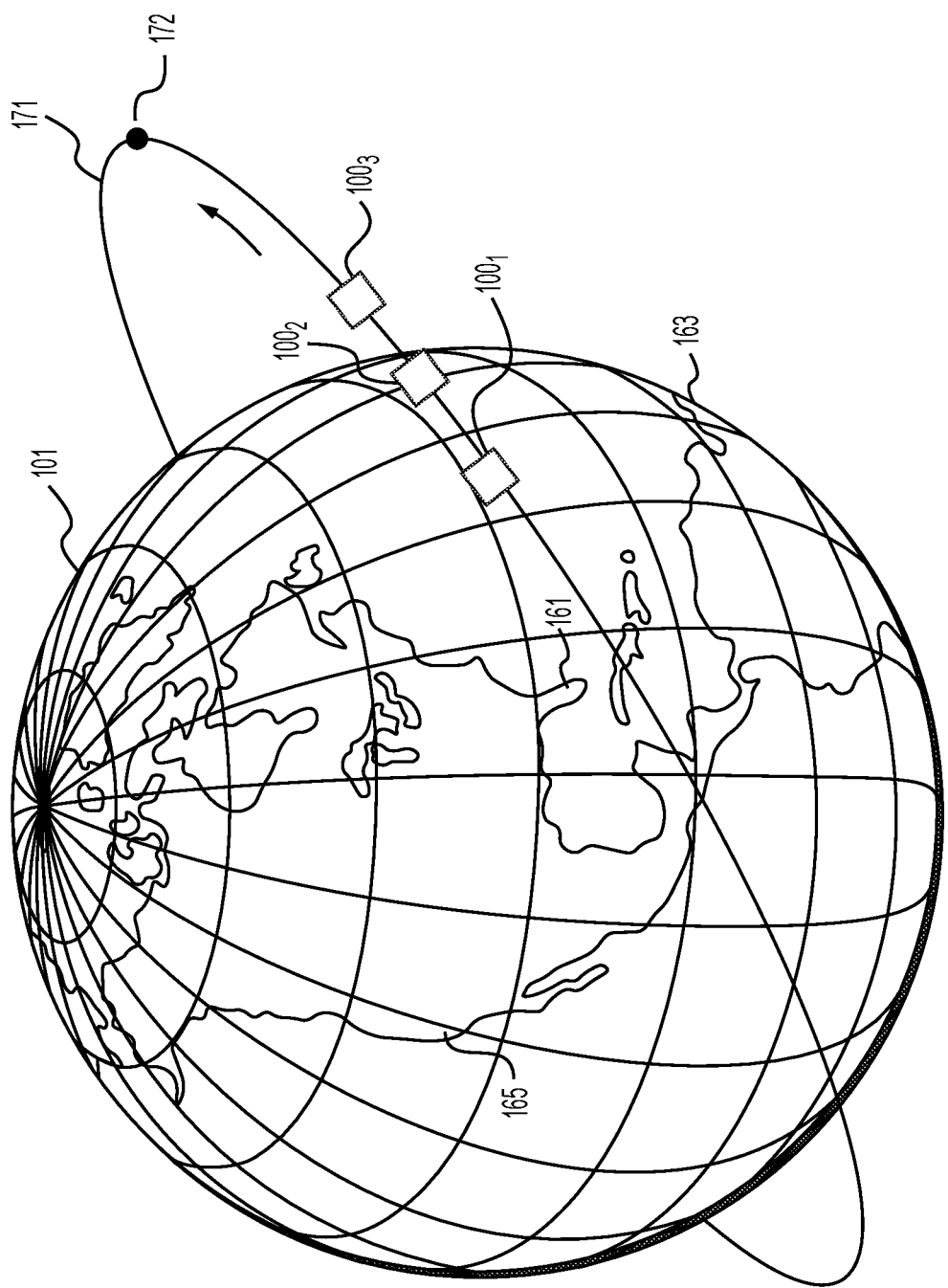
FIG. 21 illustrates an example implementation of the Earth satellite of FIG. 3.

FIG. 21 illustrates an example implementation of the Earth satellite 100 of FIG. 3 in which multiple satellites are deployed. In FIG. 21, three Earth satellites ($100_1$, $100_2$, $100_3$) are in a slightly elliptical, low earth, inclined orbit 171 around Earth 101, moving to apoapsis 172. The Earth satellites may operate in series, as each satellite passes over an area of the Earth 101, to generate plasma beams (not shown) to affect (reduce) the temperature of the area. Alternately, all three Earth satellites may be operated simultaneously to affect the temperature of the area. The satellite-to-satellite spacing may be dictated by the requirements of the mission and to prevent satellite interference. In an aspect, the satellites are "closely-spaced"; meaning the satellites are positioned in the orbit such that the plasma beams generated by each satellite provide "near-continuous" coverage of a specified area on Earth. Near-continuous coverage means that the specified area on Earth does not experience a temperature increase from one satellite to the next satellite in the constellation, or that any temperature increase is within a predetermined threshold such a 0.1 degree C., for example. Thus, a constellation of satellites may be programmed to operate with a specific spacing, whether the satellites operate in series or simultaneously. Note that launch site 161 may be the best launch site for the Earth satellites of FIG. 21. As the three Earth satellites approach apogee (apoapsis), their orbital speeds decrease.

Figure 22:
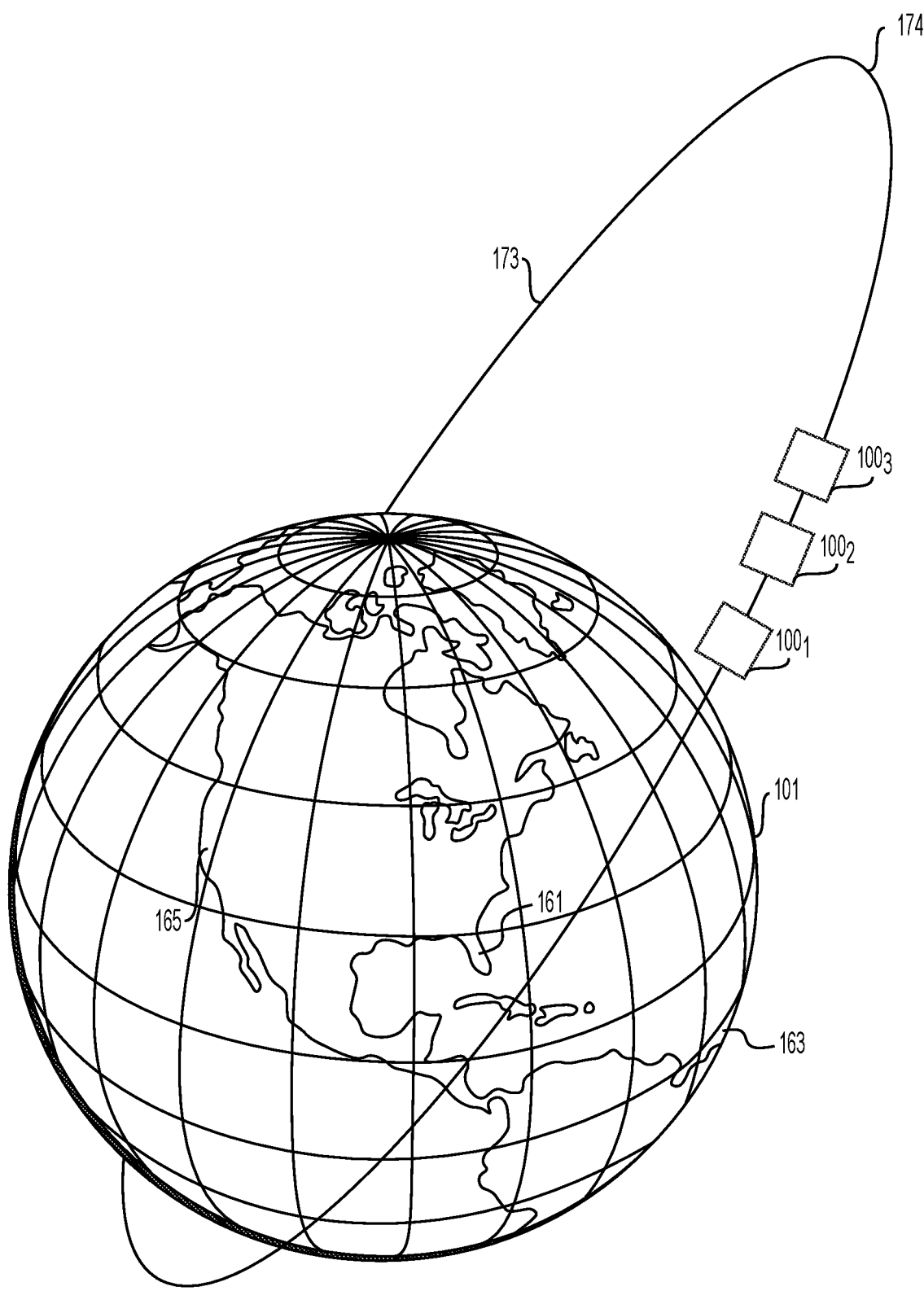
FIG. 22 illustrates an alternate example implementation of multiple Earth satellites of FIG. 3.

FIG. 22 illustrates an alternate example implementation of multiple Earth satellites 100 of FIG. 3. In FIG. 22, the three Earth satellites ($100_1$, $100_2$, $100_3$) are in a Molynia orbit 173 with apogee (apoapsis) 174. Operation of the Earth satellites of FIG. 22 may be similar to that of FIG. 21.

Tables 1A and 1B provide sample calculations to support case study 3 (see above).

TABLE 1A

| Time | 10 | 11 | 12 | 13 |
|---|---|---|---|---|
| Azim Angle | 120.5 | 138.5 | 159 | 182 |
| Elev Angle | 36.66 | 45.66 | 51.5 | 53 |

TABLE 1B

| Time from 10 | 10 to 11 | 11 to 12 | 12 to 13 | 13 to 14 |
|---|---|---|---|---|
| Delat Azim | 18 | 20.5 | 23 | 27 |
| Delat Elev | 9 | 5.84 | 1.5 | −3 |
| R approx | 35786 | 35786 | 35786 | 35786 |
| L Delta Azim | 11076.88 | 12553.16 | 14005.46 | 16272.36 |
| L Delta elev | 5607.72 | 3647.501 | 938.3803 | −1876.12 |
| Earth Rotation 1 Hr | 1672.63 | 1672.63 | 1672.63 | 1672.63 |
| L Delta Aazim-E Rot | 9404.254 | 10880.53 | 12332.83 | 14599.73 |
| L Total | 10949.27 | 11475.64 | 12368.48 | 14719.78 |
| V Km/m | 182.4878 | 191.2606 | 206.1413 | 245.3297 |
| V m/s | 3041.464 | 3187.677 | 3435.689 | 4088.828 |

SELECTED REFERENCES

TAKAHASHI, Kazunori, Helicon-type radiofrequency plasma thrusters and magnetic plasma nozzles, Reviews of Modern Plasma Physics, 3-3, pp. 1-61, May 22, 2019, published on line, discusses use of plasma thrusters for removal of space debris.

DOWDYE, E. H., The Solar Plasma limb is found to deflect Microwaves from Extra Galactic Radio Sources at Lowest Impact Parameter Corresponding to the Solar Plasma Limb, Astronomy Nachr., 000, No. 00, 1-9, Feb. 13, 2018 discusses effects of plasma on microwaves.

BOROVSKY, Joseph E., The proton and electron radiation belts at geosynchronous orbit; Statistics and behavior during high-speed stream-driven storms, Journal of geophysical Research: Space Physics, 5449868458419, Jun. 28, 2016, describes the Earth's radiation belts.

ALAMANDOLA, I. J., Interstellar Polycyclic Aromatic Hydrocarbons and Carbon in Interplanetary Dust Particles and Meteorites, Science, V.237, No. 4610, (Abstract), Jul. 3, 1987, describes the composition of interstellar dust.

The preceding disclosure refers to flowcharts and accompanying descriptions to illustrate the embodiments represented in FIG. 20. The disclosed devices, components, and systems contemplate using or implementing any suitable technique for performing the steps illustrated. Thus, FIG. 20 is for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

I claim:

1. A system for heat conditioning an area of Earth, comprising:
    a satellite comprising:
        a power supply,
        a precursor gas supply, and
        one or more double plasma beam generators coupled to the power supply and the gas supply and configured to:
            generate closed loop magnetic flux lines, wherein the closed loop magnetic flux lines constrain the plasma beams generated the one or more double plasma beam generators;
            generate a high-density plasma; and
            shape the high-density plasma using magnetic nozzles to maintain low beam thickness, high electron density of the plasma to improve absorption, reflection, and deflection of incoming electromagnetic waves.

2. The system of claim 1, wherein the satellite is geostationary.

3. The system of claim 1, wherein the one or more double plasma beam generators comprise helicons plasma beam generators.

4. The system of claim 1, wherein the satellite is further configured to inject solids, liquids, and gases into the plasma to improve a reflection factor.

5. The system of claim 1, wherein the satellite operates in an elliptical, retrograde sun-synchronous orbit.

6. The system of claim 1, comprising multiple satellites arranged in a satellite constellation.

7. The system of claim 6, wherein the multiple satellites in the satellite constellation follow a same orbital path.

8. The system of claim 6, wherein the multiple satellites in the satellite constellation follow different orbital paths.

9. The system of claim 1, wherein the precursor gas supply provides a gas selected from a group consisting of argon, $CH_4$, $CO_2$, hydrogen, nitrogen ($N_2$) $N_2O_3$, neon, xenon and gasses.

10. The system of claim 1, wherein the area of Earth comprises a land area, an ocean area, and a man-made structure.

11. The system of claim 1, wherein the satellite follows a Molynia orbit.

12. The system of claim 1, wherein the satellite is configured to trap solar dust in the plasma.

13. The system of claim 1, wherein the power supply is selected from a group consisting of solar collectors and converters, a plutonium-based heat engine, and combinations of the solar collectors and converters and the plutonium-based heat engine.

14. The system of claim 1, wherein the precursor comprises a refillable, pressured gas supply tank.

15. An Earth satellite configured for heat conditioning areas of Earth, comprising:
    a satellite power supply;
    a precursor gas supply tank containing a pressurized precursor gas;
    one or more double plasma beam generators coupled to the satellite power supply and the gas supply tank, each double plasma beam generator comprising:
        opposing plasma tubes configured to receive the pressurized gas from the precursor gas supply tank,
        a magnetic coil assembly surrounding the opposing plasma tubes and configured to impose a magnetic field on gas in the opposing plasma tubes to form a plasma,
        an output nozzle connected to a distal end of each of the opposing plasma tubes, and
        a solenoid assembly integrated with each output nozzle, and configured to generate a closed loop magnetic field, wherein each opposing plasma tube cooperates with the output nozzle and the solenoid assembly to expand the plasma gas and trap the plasma gas within the closed loop magnetic field; and
    a processor executing machine instructions to control operation of the power supply and each of the one or more double plasma beam generators, the satellite provides plasma beams for absorption, reflection, and deflection of incoming electromagnetic waves emitted by a Sun.

16. The satellite of claim 15, further comprising a solid particle injection tank, the solid particle injection tank storing solid particles into the plasma tubes in concert with supply of the pressurized precursor gas, wherein the solid particles are trapped in a plasma beam and improve the absorption, reflection, and deflection of the incoming electromagnetic waves emitted by the Sun.

17. The satellite of claim 16, wherein the satellite follows an elliptical orbit selected and maintained to position the satellite between a specific Earth area and the Sun for each rotation of the satellite around the Earth.

18. The satellite of claim 17, wherein the satellite is one of multiple, closely-spaced satellites in a constellation of satellites, each of the multiple, closely-spaced satellites following a same orbit, wherein satellite spacing is selected to provide near-continuous coverage of the specific earth area by the plasma beams.

19. The satellite of claim 17, wherein the satellite is one of multiple, satellites in a constellation of satellites, each of the multiple, satellites following a same orbit type at differing altitudes when traversing a specific Earth area.

20. The satellite of claim 17, configured to follow a Lagrange point orbit.

21. A method for heat conditioning a specific area of Earth, comprising:
a processor executing machine instructions to:
operate a precursor gas supply tank containing a pressurized precursor gas to release the gas; and
operate one or more double plasma beam generators coupled to a satellite power supply and the gas supply tank, each double plasma beam generator, comprising:
opposing plasma tubes configured to receive the pressurized gas from the precursor gas supply tank,
a magnetic coil assembly surrounding the opposing plasma tubes and configured to impose a magnetic field on gas in the opposing plasma tubes to form a plasma,
an output nozzle connected to a distal end of each of the opposing plasma tubes, and
a solenoid assembly integrated with each output nozzle, and configured to generate a closed loop magnetic field, wherein the processor controls operation of each opposing plasma tube cooperates with the output nozzle and the solenoid assembly to expand the plasma gas and trap the plasma gas within the closed loop magnetic field.

* * * * *